(12) United States Patent
Jesewitz et al.

(10) Patent No.: US 12,097,936 B2
(45) Date of Patent: Sep. 24, 2024

(54) AXIAL FLUX PROPULSION SYSTEM FOR AN ELECTRIC BOAT

(71) Applicant: EVOA, LLC, Orlando, FL (US)

(72) Inventors: Raymond L. Jesewitz, Apopka, FL (US); Michael J. Anderson, Orlando, FL (US)

(73) Assignee: EVOA, LLC, Orlando, FL (US)

( * ) Notice: Subject to any disclaimer, the term of this patent is extended or adjusted under 35 U.S.C. 154(b) by 448 days.

(21) Appl. No.: 17/505,241

(22) Filed: Oct. 19, 2021

(65) Prior Publication Data
US 2022/0169349 A1 Jun. 2, 2022

Related U.S. Application Data

(63) Continuation-in-part of application No. 17/226,579, filed on Apr. 9, 2021, now Pat. No. 11,772,768, (Continued)

(51) Int. Cl.
*B63B 79/40* (2020.01)
*B60L 58/26* (2019.01)
(Continued)

(52) U.S. Cl.
CPC .............. *B63B 79/40* (2020.01); *B60L 58/26* (2019.02); *B63H 11/08* (2013.01); *B63H 20/02* (2013.01);
(Continued)

(58) Field of Classification Search
CPC ...... B63B 79/40; B60L 58/26; B60L 2200/32; B63H 11/08; B63H 20/02; B63H 20/285;
(Continued)

(56) References Cited

U.S. PATENT DOCUMENTS

| 1,534,725 A | 4/1925 | Macmillan |
| 4,764,136 A * | 8/1988 | Johansson ............. F02B 61/045 440/89 R |

(Continued)

FOREIGN PATENT DOCUMENTS

| CN | 205149553 | 4/2016 |
| CN | 205149553 U | 4/2016 |

(Continued)

OTHER PUBLICATIONS

Non-Final Office Action issued in related U.S. Appl. No. 17/337,991 dated Sep. 21, 2023, 9 pages.
(Continued)

*Primary Examiner* — Stephen P Avila
(74) *Attorney, Agent, or Firm* — Lewis Rice LLC

(57) ABSTRACT

An axial flux propulsion system for an electric boat that includes interconnecting subsystems including a mounting system, a traction system, a transmission system, an electrical power distribution system, a control system, and a fluid management system, among other boat systems. The traction system typically is an axial flux motor/generator. Various embodiment of the axial flux propulsion system may include a stern drive embodiment and a jet drive embodiment. Portions of the axial flux propulsion system may be both inboard and outboard. A control system may control the operation of the various boat systems including the axial flux motor/generator, and as a result, control the overall operation of the boat.

17 Claims, 20 Drawing Sheets

Related U.S. Application Data which is a continuation-in-part of application No. 17/120,106, filed on Dec. 11, 2020, now abandoned, application No. 17/505,241 is a continuation-in-part of application No. 17/337,991, filed on Jun. 3, 2021, now Pat. No. 11,932,367.

(60) Provisional application No. 62/946,478, filed on Dec. 11, 2019, provisional application No. 63/034,509, filed on Jun. 4, 2020.

(51) Int. Cl.
    *B63H 11/08*      (2006.01)
    *B63H 20/02*      (2006.01)
    *B63H 20/28*      (2006.01)
    *B63H 23/06*      (2006.01)
    *B63H 23/34*      (2006.01)
    *H02K 7/10*      (2006.01)
    *H02K 7/14*      (2006.01)

(52) U.S. Cl.
CPC .......... *B63H 20/285* (2013.01); *B63H 23/06* (2013.01); *B63H 23/34* (2013.01); *H02K 7/10* (2013.01); *H02K 7/14* (2013.01); *B60L 2200/32* (2013.01)

(58) Field of Classification Search
CPC .......... B63H 23/06; B63H 23/34; H02K 7/10; H02K 7/14
See application file for complete search history.

(56) References Cited

U.S. PATENT DOCUMENTS

| | | | |
|---|---|---|---|
| 5,109,172 A | 4/1992 | Pace | |
| 5,229,677 A | 7/1993 | Dade et al. | |
| 5,684,690 A | 11/1997 | Levedahl | |
| 6,396,161 B1 | 5/2002 | Crecelius et al. | |
| 8,118,627 B2 | 2/2012 | Wejrzanowski et al. | |
| 8,298,023 B2 | 10/2012 | Daikoku | |
| 8,535,104 B1 | 9/2013 | Nida | |
| 8,608,521 B1 | 12/2013 | Snyder et al. | |
| 8,682,516 B1 | 3/2014 | Balogh et al. | |
| 8,725,329 B1 | 5/2014 | Snyder et al. | |
| 8,808,139 B1 | 8/2014 | Arbuckle et al. | |
| 8,992,274 B1 | 3/2015 | Ward et al. | |
| 9,028,285 B2 | 5/2015 | Tamba | |
| 9,321,516 B1 | 4/2016 | Lafreniere et al. | |
| 9,533,747 B2 | 1/2017 | Arbuckle et al. | |
| 11,772,768 B1 * | 10/2023 | Jesewitz | B63H 21/17 440/1 |
| 11,932,367 B1 * | 3/2024 | Jesewitz | B63H 20/14 |
| 2007/0152626 A1 | 7/2007 | Boebel | |
| 2009/0209146 A1 | 8/2009 | Jegel | |
| 2010/0285702 A1 | 11/2010 | Platon | |
| 2012/0083173 A1 | 4/2012 | McMillan | |
| 2013/0233230 A1 | 9/2013 | Rohden | |
| 2018/0208290 A1 | 7/2018 | Biebach | |
| 2020/0062361 A1 | 2/2020 | Nakamura | |

FOREIGN PATENT DOCUMENTS

| | | |
|---|---|---|
| WO | 2010066248 A3 | 12/2008 |
| WO | 2009082808 A1 | 7/2009 |
| WO | 201066248 A3 | 6/2010 |

OTHER PUBLICATIONS

Office Action in Canadian Application No. 3,147,937, mailed Feb. 20, 2024, 5 pages.

Office Action from U.S. Appl. No. 18/375,100, mailed Apr. 8, 2024, 13 pages.

* cited by examiner

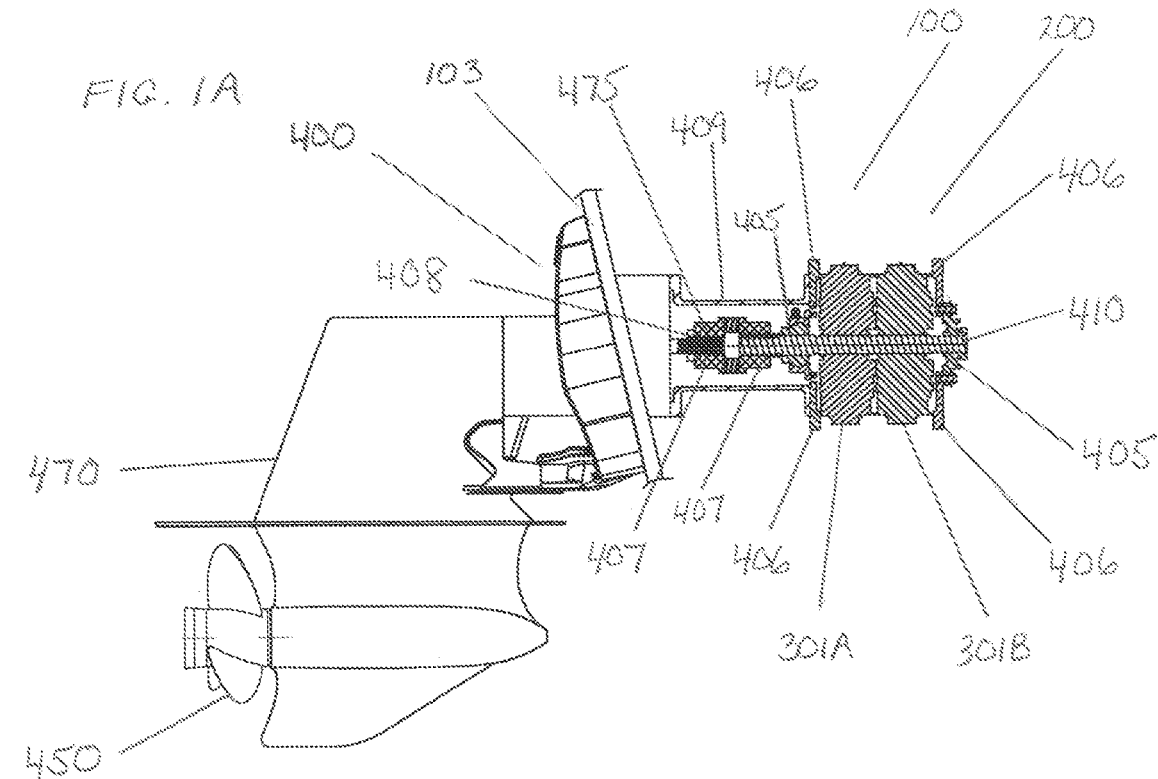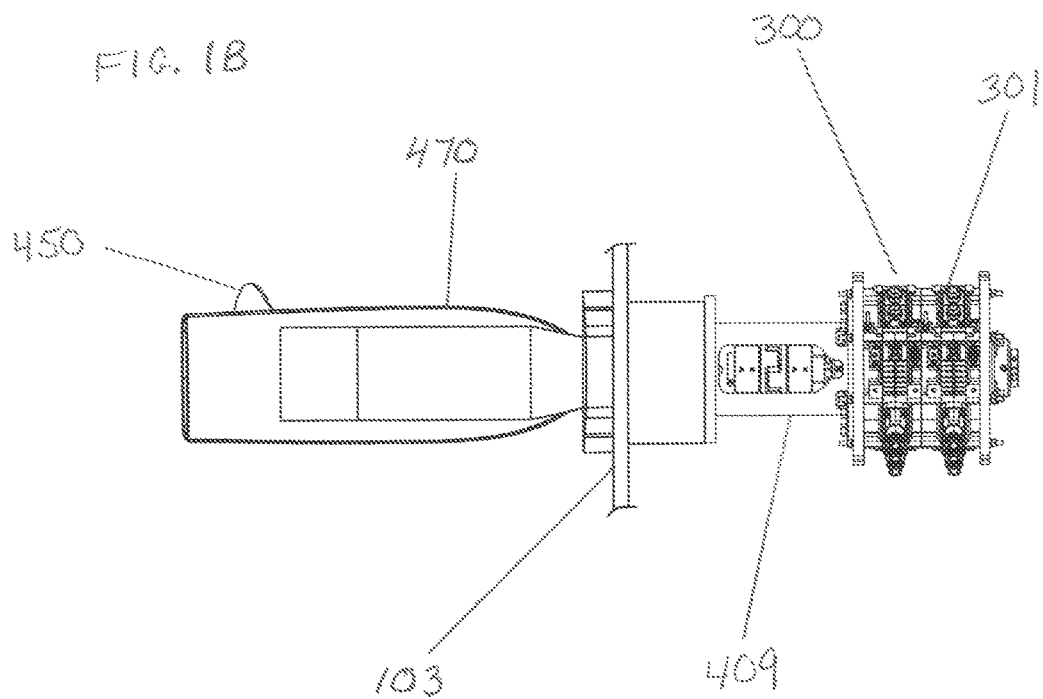

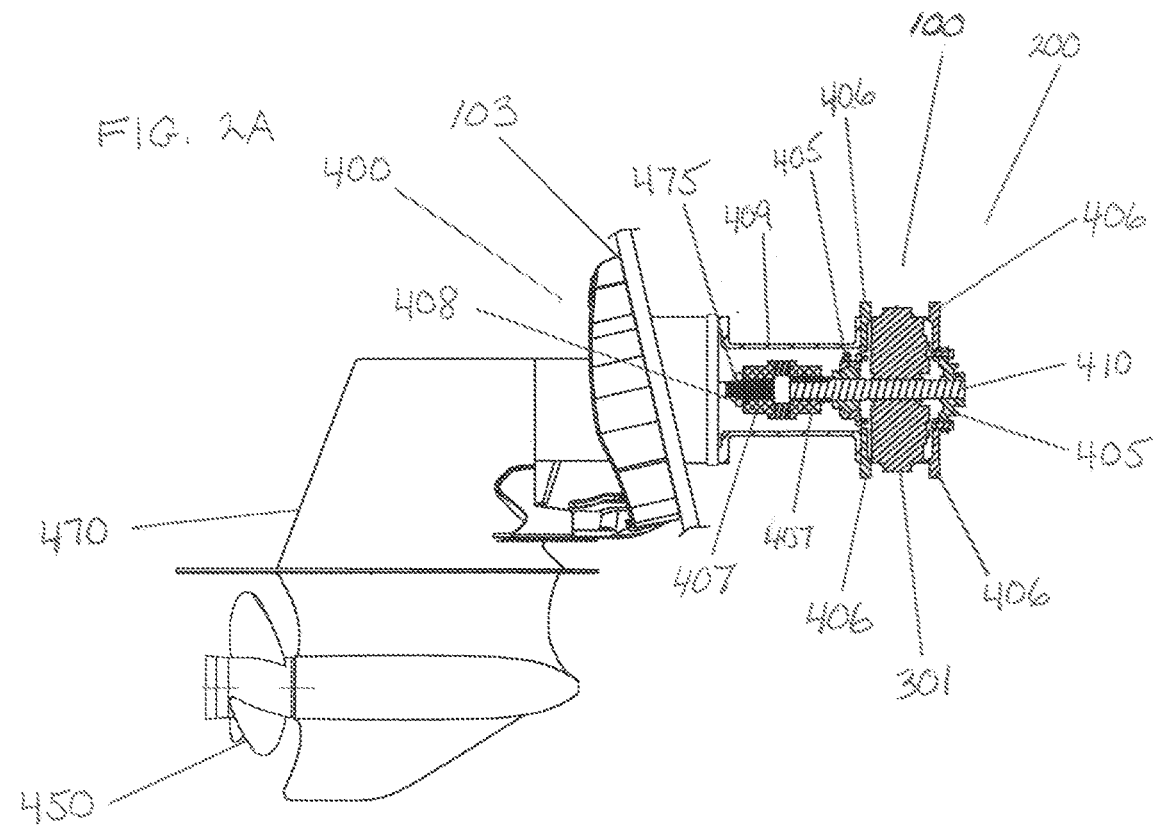
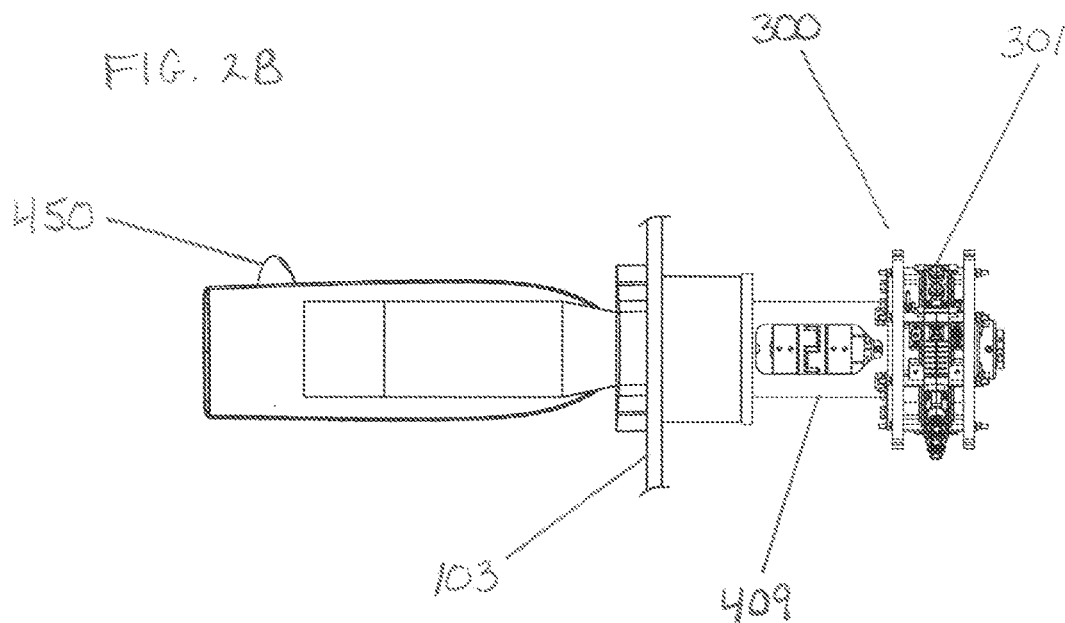

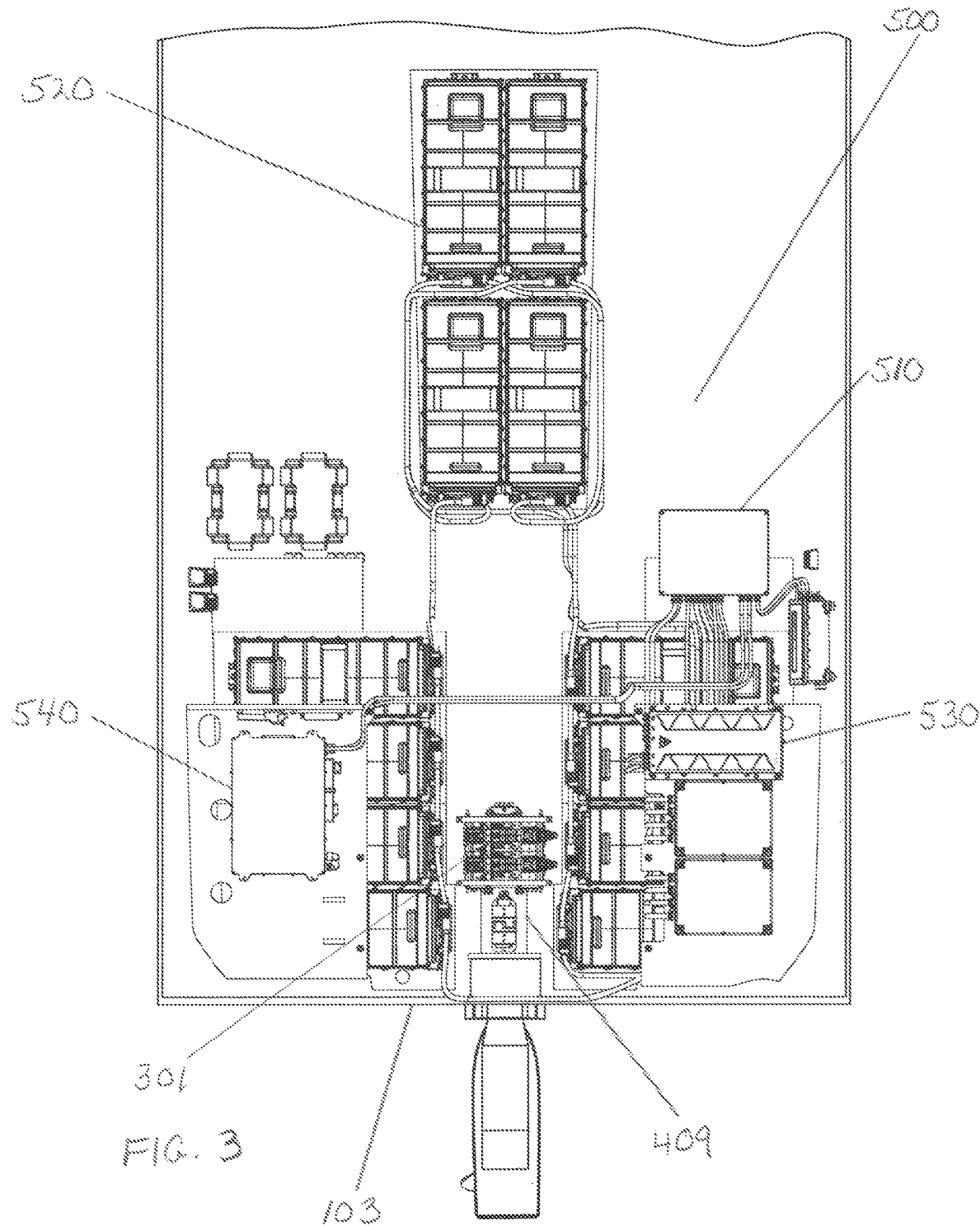

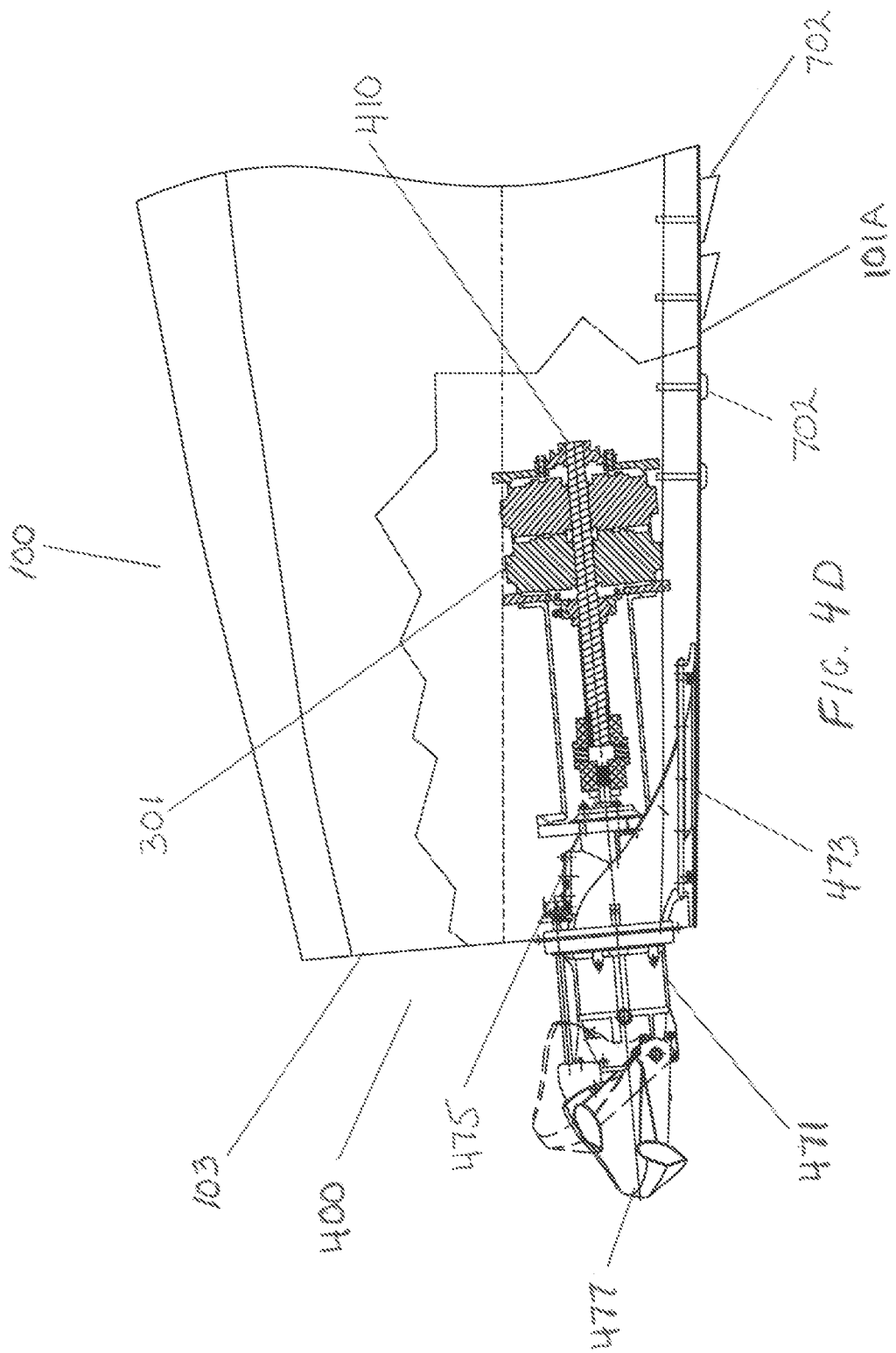

AXIAL FLUX MOTOR - OPERATION MODES

| OPERATION MODE | 100% ELECTRIC |
|---|---|
| 1. IN NEUTRAL - READY STATE | (T0) |
| ICE | NONE |
| CLUTCH 1 | NONE |
| CLUTCH2 | NONE |
| MOTOR 1-TRACTION/ GEN | OFF |
| MOTOR 2 - TRACTION/ GEN | OFF |
| BATTERY STATE | STEADY |
| 2. IDLE SPEED (< 5 mph) | (T1) |
| ICE | NONE |
| CLUTCH 1 | NONE |
| CLUTCH2 | NONE |
| MOTOR 1-TRACTION/ GEN | TRACTION ON |
| MOTOR 2 - TRACTION/ GEN | TRACTION OFF |
| BATTERY STATE | DISCHARGING |
| 3. ACCELERATION (0 - 40 mph) | (T2) |
| ICE | NONE |
| CLUTCH 1 | NONE |
| CLUTCH2 | NONE |
| MOTOR 1-TRACTION/ GEN | TRACTION ON |
| MOTOR 2 - TRACTION/ GEN | TRACTION ON |
| BATTERY STATE | DISCHARGING |

FIG. 11A

| AXIAL FLUX MOTOR - OPERATION MODES | |
|---|---|
| OPERATION MODE | 100% ELECTRIC |
| 4. WAKESURF MODE I - (all electric ~12 mph) | (T3) |
| ICE | NONE |
| CLUTCH 1 | NONE |
| CLUTCH 2 | NONE |
| MOTOR 1 - TRACTION/ GEN | TRACTION ON |
| MOTOR 2 - TRACTION/ GEN | TRACTION ON |
| BATTERY STATE | DISCHARGING |
| 5. WAKESURF MODE II - (~12 mph) | (T3) |
| ICE | NONE |
| CLUTCH 1 | NONE |
| CLUTCH 2 | NONE |
| MOTOR 1 - TRACTION/ GEN | TRACTION ON |
| MOTOR 2 - TRACTION/ GEN | TRACTION ON |
| BATTERY STATE | DISCHARGING |
| 6. WAKEBOARD/ TUBE MODE - (~22 mph) | (T3) |
| ICE | NONE |
| CLUTCH 1 | NONE |
| CLUTCH 2 | NONE |
| MOTOR 1 - TRACTION/ GEN | TRACTION ON |
| MOTOR 2 - TRACTION/ GEN | TRACTION ON |
| BATTERY STATE | DISCHARGING |

FIG. 11B

| AXIAL FLUX MOTOR - OPERATION MODES | |
|---|---|
| OPERATION MODE | 100% ELECTRIC |
| 7. CRUISE MODE - (23+ mph) | (T2) |
| ICE | NONE |
| CLUTCH 1 | NONE |
| CLUTCH 2 | NONE |
| MOTOR 1-TRACTION/ GEN | TRACTION ON |
| MOTOR 2 - TRACTION/ GEN | TRACTION ON |
| BATTERY STATE | DISCHARGING |
| | |
| 8. WIDE OPEN THROTTLE - (WOT) | (T2) |
| ICE | NONE |
| CLUTCH 1 | NONE |
| CLUTCH 2 | NONE |
| MOTOR 1-TRACTION/ GEN | TRACTION ON |
| MOTOR 2 - TRACTION/ GEN | TRACTION ON |
| BATTERY STATE | DISCHARGING |

FIG. 11C

AXIAL FLUX PROPULSION SYSTEM FOR AN ELECTRIC BOAT

CROSS-REFERENCE TO RELATED APPLICATIONS

This application is a continuation-in-part of U.S. Utility patent application Ser. No. 17/226,579, filed Apr. 9, 2021, which is a continuation-in-part of U.S. Utility patent application Ser. No. 17/120,106, filed Dec. 11, 2020, which claims the benefit of U.S. Provisional Application No. 62/946,478, filed Dec. 11, 2019. This application is also a continuation-in-part of U.S. Utility patent application Ser. No. 17/337,991, filed Jun. 3, 2021, which claims the benefit of U.S. Provisional Application No. 63/034,509, filed Jun. 4, 2020. The entire disclosures of all of the above documents are hereby incorporated by reference.

FIELD OF THE APPARATUS AND METHOD

The invention relates to the field of electrically propelled boats.

BACKGROUND OF THE INVENTION

Axial flux motors have been known and used for decades as shown, for example, in U.S. Pat. No. 5,109,172, which is incorporated herein by reference in its entirety.

Early use of axial flux in electronic devices was primarily as sensors (such as transducers). As more powerful axial flux devices were developed, axial flux motors were created and deployed.

Prior use of axial flux motors in marine propulsion includes, for example, U.S. Pat. No. 5,229,677, which is incorporated herein by reference in its entirety. In the past, axial flux motors were typically used in applications that could take advantage of their relatively flat construction when compared to radial flux motors. Axial flux motors have been used primarily for small, flat, low-cost motors.

However, some axial flux motors have been used in larger applications, such as in marine vehicles. An example of an axial flux motor/generator for marine vehicles is provided by U.S. Pat. No. 5,229,677, which is incorporated herein by reference in its entirety, where the motor/generator has an axial gap design with a disk-shaped rotor and two disk-shaped stators.

Further, it is known that axial flux motors/generators may provide more power and density, due to smaller size and the alignment of the rotor and stator coils (as well as due to the flux field generator) when compared to radial flux motors.

In addition, marine vehicles have been driven by a variety of different motor outputs. For example, some marine vehicles may have what is known as a stern drive, which is a combination of inboard motor power and outboard drive. In a boat having a motor with stern drive, the engine typically sits just forward of the boat's transom while the drive unit (outdrive or drive leg) lies outside the hull. Such a design may take advantage of some of the strengths of both inboard and outboard motor designs.

Another drive option for marine vehicles is the jet drive. In a jet drive, the boat is propelled by a jet of water ejected from the stern. Unlike a stern drive boat that uses an external propeller in the water below or just behind the boat, a jet drive boat draws water from under the boat through an intake and into a pump-jet inside the boat, expelling the water through a nozzle at the stern.

Both boat-driving technologies are used today, but each have limited acceptance with electric motor systems. Accordingly, there is a need in the art for an electronic boat having the convenient power output of a stern drive or a jet drive with the power and efficiency of an axial flux motor.

BRIEF SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein is electric boat having one or more axial flux motors and either a stern drive or jet drive output.

It is an object of the invention to provide an axial flux propulsion system for an electric boat or other watercraft. It is further an object of the invention to provide an electric boat or other watercraft having an axial flux propulsion system.

In an embodiment, described herein, among other things is an axial flux propulsion system for a stern drive boat, which may include: at least one axial flux motor/generator; a transmission box; a transmission shaft connected to the at least one axial flux motor/generator and to the transmission box; a propeller connected to the transmission box; an electrical power distribution system for providing power to the at least one axial flux motor/generator including at least one battery; and a control system that includes at least a communication system and a throttle that together control at least the at least one axial flux motor/generator, wherein the control system directs the electrical power distribution system to increase, decrease, or suspend electrical power to the at least one axial flux motor/generator in response to signals from the throttle and the communication system, wherein the transmission box is positioned to extend at least in part from the boat, and wherein the at least one axial flux motor/generator is positioned within the boat.

In an embodiment of an axial flux propulsion system, the at least one axial flux motor/generator includes a first axial flux motor/generator positioned adjacent to a second axial flux motor/generator; wherein the first axial flux motor/generator and the second axial flux motor/generator are positioned on the transmission shaft; and wherein the first axial flux motor/generator and a second axial flux motor/generator may be independently operated by the control system.

In an embodiment of an axial flux propulsion system, the axial flux propulsion system is positioned on a boat transom of the boat to provide propulsion for the boat.

In an embodiment of an axial flux propulsion system, the at least one axial flux motor/generator and the at least one battery are substantially aligned along the longest length of the boat.

In an embodiment of an axial flux propulsion system, the system further comprises a fluid management system, the fluid management system cooling the at least one axial flux motor/generator and the at least one battery.

In an embodiment of an axial flux propulsion system, the fluid management system for cooling further comprising at least one raw water intake port formed in the hull of the boat.

In an embodiment of an axial flux propulsion system, the at least one axial flux motor/generator is a single axial flux motor/generator.

In an embodiment of an axial flux propulsion system, the transmission box further comprises at least one forward gear and at least one reverse gear.

In an embodiment of an axial flux propulsion system, the transmission box includes a plurality of gears, wherein each gear is a forward gear.

In an embodiment of an axial flux propulsion system, the at least one axial flux motor/generator may be operated in a reverse polarity state.

In another embodiment, described herein, among other things is axial flux propulsion system for a jet drive boat including: at least one axial flux motor/generator; a pumping unit in fluid communication with a water intake; a transmission shaft connected to the at least one axial flux motor/generator and to the pumping unit; an electrical power distribution system for providing power to the at least one axial flux motor/generator including at least one battery; and a control system that includes at least a communication system and a throttle that together control at least the at least one axial flux motor/generator, wherein the control system directs the electrical power distribution system to increase, decrease, or suspend electrical power to the at least one axial flux motor/generator in response to signals from the throttle and the communication system, wherein the pumping unit is positioned to extend at least in part from the boat, and wherein the at least one axial flux motor/generator is positioned within the boat.

In an embodiment of an axial flux propulsion system, the at least one axial flux motor/generator includes a first axial flux motor/generator positioned adjacent to a second axial flux motor/generator; wherein the first axial flux motor/generator and the second axial flux motor/generator are positioned on the transmission shaft; and wherein the first axial flux motor/generator and a second axial flux motor/generator may be independently operated by the control system.

In an embodiment of an axial flux propulsion system, the axial flux propulsion system is positioned on a boat transom of the boat to provide propulsion for the boat.

In an embodiment of an axial flux propulsion system, at least one axial flux motor/generator and the at least one battery are substantially aligned along the longest length of the boat.

In an embodiment of an axial flux propulsion system, the system further comprises a fluid management system, the fluid management system cooling the at least one axial flux motor/generator and the at least one battery.

In an embodiment of an axial flux propulsion system, the fluid management system for cooling further comprising at least one raw water intake port formed in the hull of the boat.

In an embodiment of an axial flux propulsion system, the at least one axial flux motor/generator is a single axial flux motor/generator.

BRIEF DESCRIPTION OF THE DRAWINGS

The apparatus will be better understood when consideration is given to the following detailed description thereof.

FIG. 1A presents a side cutaway view of an embodiment of an axial flux propulsion system having multiple axial flux motors/generators and a stern drive output.

FIG. 1B presents a top plan view of the embodiment of an axial flux propulsion system presented in FIG. 1A.

FIG. 2A presents a side cutaway view of an embodiment of an axial flux propulsion system having one axial flux motor/generator and a stern drive output.

FIG. 2B presents a top plan view of the embodiment of an axial flux propulsion system presented in FIG. 2A.

FIG. 3 presents a top plan view of a power delivery system for an embodiment of an axial flux propulsion system having multiple axial flux motors/generators and a stern drive output.

FIG. 4D presents a close up side cutaway view of the embodiment of an axial flux propulsion system presented in FIG. 4A positioned within the boat presented in FIG. 4E.

FIG. 11A presents operating modes of an embodiment of an axial flux propulsion system.

FIG. 11B presents operating modes of an embodiment of an axial flux propulsion system.

FIG. 11C presents operating modes of an embodiment of an axial flux propulsion system.

DETAILED DESCRIPTION OF THE INVENTION

The invention of an axial flux propulsion system (100) for an electric boat (101) is provided herein and in FIGS. 1A through 12. In particular, two embodiment of an axial flux propulsion system (100) are primarily discussed herein, the first having a stern drive as shown in FIGS. 1A through 3 and the second having being a jet drive shown in FIGS. 4A through 6. Further, each embodiment may have one or more axial flux motors (301). Although these two embodiments will be discussed herein separately at times, the overarching design of the axial flux propulsion system (100) in either embodiment is similar. Further, the control and other auxiliary systems are similar across the embodiments. However, there are considerable differences in how each embodiment of the axial flux propulsion system (100) converts the energy from the axial flux motors (301) into propulsion.

Figure 6:
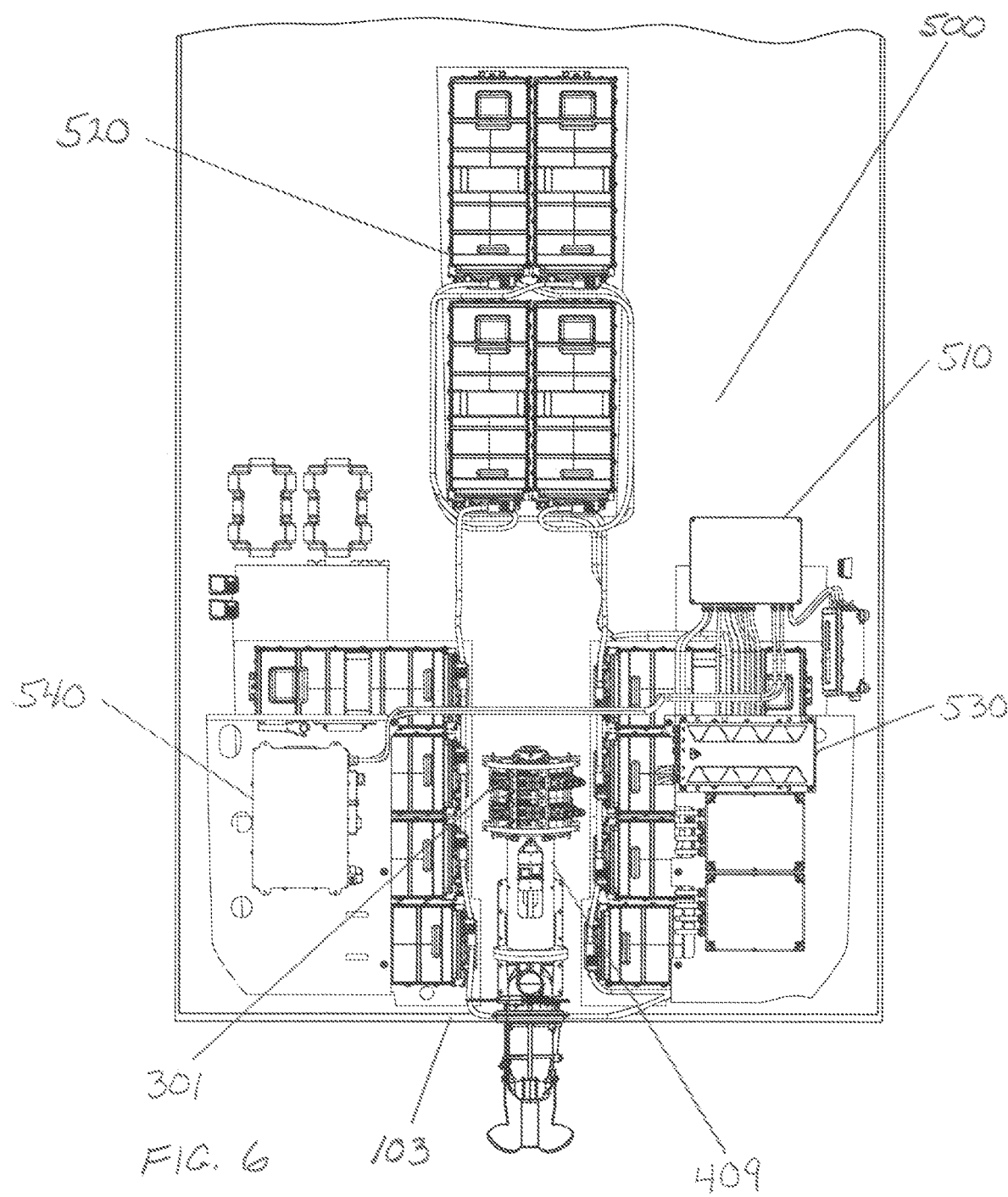
FIG. 6 presents a top plan view of a power delivery system for an embodiment of an axial flux propulsion system having multiple axial flux motors/generators and a jet drive output.
Figure 7:
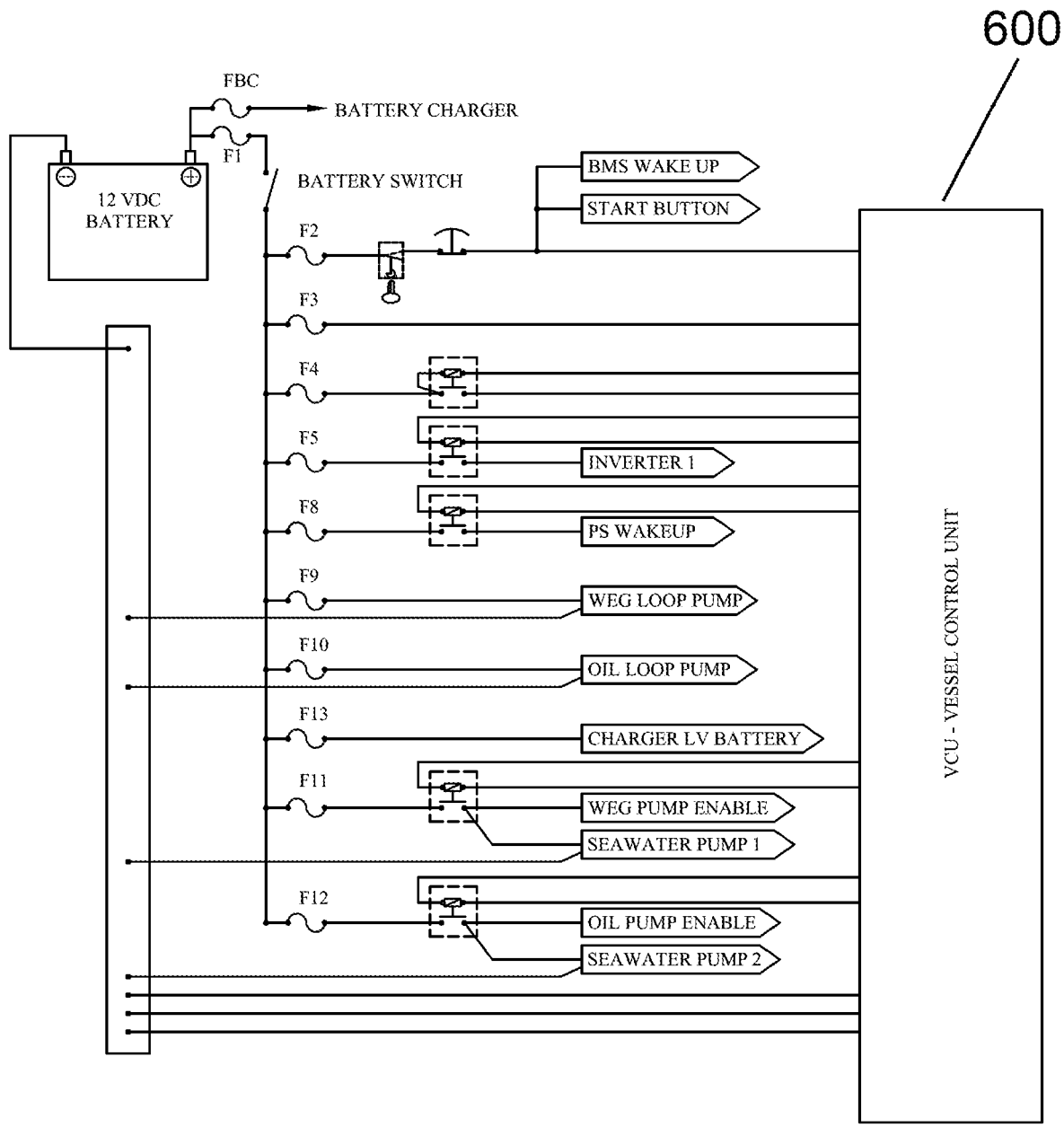
FIG. 7 presents a diagram of an embodiment of a power delivery system for an embodiment of an axial flux propulsion system.

Each axial flux propulsion system (100) has interconnecting subsystems that comprise the whole. These subsystems include, generally, a mounting system (200), a traction system (300), a transmission system (400), an electric power distribution system (500), a control system (600), and a fluid management system (700), among other boat (101) systems. The axial flux propulsion system (100) itself may be positioned (at least partially) within a boat hull (101A) to provide propulsion for the boat (101), as shown, for example, in FIGS. 1C, 1D, 4C, 4D, and 4E. For example and as shown in FIGS. 1A, 1C, 4A, and 4C, most of the components of the axial flux propulsion system (100) are located within the boat hull (101A), including the components of the mounting system (200) and the traction system (300). FIGS. 3 and 6 show that the electric power distribution system (500) is also within the boat hull (101A). These figures also show that many portions of the transmission system (400) are within the boat hull (101A), but also that most of axial flux propulsion system (100) components that are outside of the boat hull (101A) are within the transmission system (400). Accordingly, the externally located components must be designed to withstand the various hazards of exposure including increased contact from foreign objects and corrosion/weathering from the ambient environment.

Traction System, Transmission System, and Mounting System

In the overall operation of a stern drive or jet drive embodiment of an axial flux propulsion system (100), the traction system (300), via the transmission system (400), may impart force to a propeller (450) or a pumping unit (471). Such a propeller (450) may produce thrust when the propeller is submerged in a liquid (such as water), and such a pumping unit (471) may produce thrust when a related water intake (473) is submerged in a liquid (such as water).

For the traction system (300), the axial flux propulsion system (100) may be powered by at least one axial flux motor/generator (301) positioned on a transmission shaft (410), which transmission shaft (410) may be coupled to a propeller (450) in stern drive embodiments and to a pumping unit (471) in jet drive embodiments. This is a generalized chain of components that are relied upon in most embodiments of the axial flux propulsion system (100) contemplated herein. Generally, the traction system (300) disclosed herein is used for generating torque, and the transmission system (400) is used to convert torque at the input (e.g., axial flux motor/generator (301)) to torque at the output (a propeller (450) or a pumping unit (471)).

In some embodiments, more than a single axial flux motor (301) may be used. For example, FIGS. 1A and 4A each show an axial flux propulsion system (100) having both a first axial flux motor (301A) and a second axial flux motor (301B). More or less axial flux motors (301) may be used. For example, FIGS. 2A, 2B, 5A, and 5B each show an axial flux propulsion system 100) having only a single axial flux motor (301). Further, such axial flux motors (301) may have any form, construction, and composition that would be capable of creating an axial flux motor, as would be understood by persons of ordinary skill in the art.

In embodiments having two or more axial flux motors (301), each motor may be independently controlled and engaged with the transmission system (400). Typically, this independent control may be accomplished through independently requesting desired torque from each of the two or more axial flux motors (301). Actual torque of each axial flux motor may be controlled by setting all motors to an on state, while selectively providing power to each independently in order to meet the actual torque demanded of each axial flux motor. A zero torque request to any one motor allows that "disengaged" motor to spin freely without draining power. Accordingly, disengagement in this context may include physical movement when power is not being transferred to a given motor and that given motor is not providing torque. In other embodiments not depicted herein, a series of clutches may be used to control physical engagement. In some embodiments, output power and electricity generating power may be simultaneously produced.

Embodiments of the axial flux propulsion system (100) for an electric boat (101) will typically include a mounting system (200) for supporting components of the propulsion system (100). Such a mounting system (200) may include any number of supports and may support any component of the axial flux propulsion system within the relevant boat hull (101A). For example, any axial flux motors (301) may be supported by, and affixed to the boat (100) by, a number of mounts positioned between the axial flux motors (301) an the boat hull (101A). Such mounts may take any form, construction, and composition that would be capable of supporting the intended components, as would be understood by persons of ordinary skill in the art. In some embodiments, the mounting system (200) may support components that are external to the boat hull (101A), including, without limitation, any outboard components of stern drive and jet drive axial flux propulsion system (100).

Each embodiment of a transmission system (400) for transmitting torque depicted in the figures may include at least a transmission shaft (410) and a transmission box stub (475). Further, stern drive embodiments include a propeller (450), while jet drive embodiments include a pumping unit (471). The particulars of stern drive and jet drive embodiments will now be discussed.

As shown in FIG. 1A, a first alternate embodiment of an axial flux propulsion system (100) for an electric boat (101) may include a traction system (300) including a first axial flux motor/generator (301A) positioned adjacent to a second axial flux motor/generator (301B), wherein both motors/generators (301) are positioned on a common transmission shaft (410). The first and second axial flux motors/generators (301A, 301B) may be operated in unison or independently of each other, as directed by the control system (600). The first and second axial flux motors/generators (301A, 301B) may be operated to propel the relevant boat (101) in water, to charge any onboard or other batteries (520), or for another purpose.

The axial flux motors/generators (301A, 301B) may be connected at their central core region to a common transmission shaft (410), as shown in FIG. 1A through 2B. The transmission shaft (410) may then be supported by one or more (typically a pair of) support bearings (405) that are positioned on motor mounts (406) or similar supportive structures. The motor mounts (406) may be attached to the hull of the relevant boat (101) or to some other structure, such as a boat substructure. The transmission shaft (410) typically extends into a shaft coupling (407). The transmission shaft (410) is typically coupled to a transmission box stub (475) by the shaft coupling (407) and a collar (408). The transmission box stub (475) may be mechanically linked or coupled within a transmission box (470) to a propeller shaft (449). This connection may be direct or may include intervening couplings.

Axial flux propulsion system (100) for stern drives typically extend through the relevant boat transom (103) at a point near the transmission stub (475) or at some point along the extent of the transmission box (470). The transmission shaft (410) and transmission box stub (475) are typically enclosed in a shaft housing (409) that is attached to a motor mount (406) or other support structure, as well as to the transmission box (470). The propeller shaft (449) may be coupled to the propeller (450), imparting torque during use. In operation in this exemplary embodiment, the torque from the axial flux motor (301) may be applied to the transmission shaft (410) that is then coupled to the transmission box (470) via the transmission box stub (475). The transmission box (470) may then transmit the torque to the propeller shaft (449) that turns the propeller (450) and provides propulsion for the relevant boat (101). This chain of torque transfer may allow the relevant boat (101) to be propelled in water.

Figure 1C:
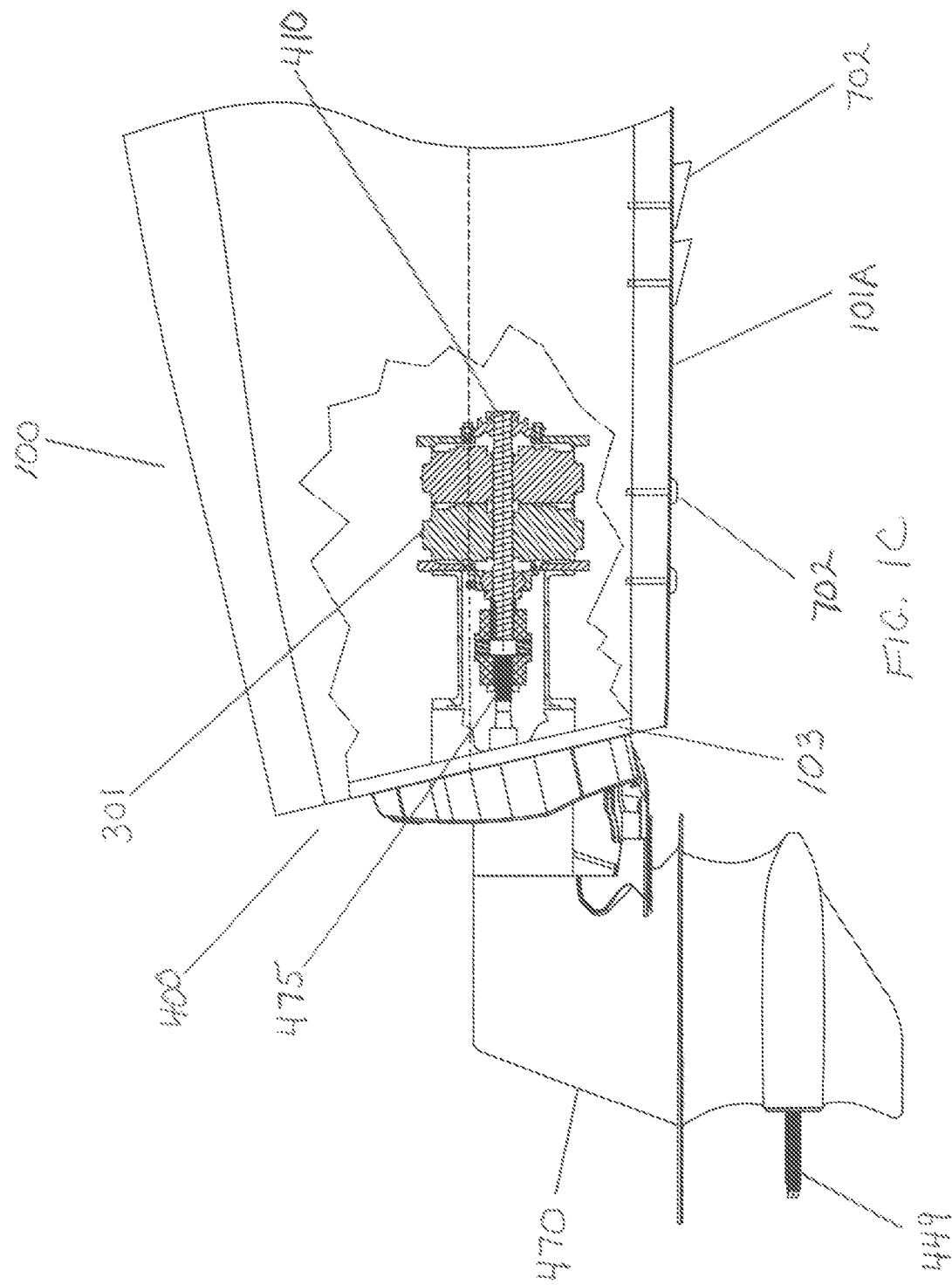
FIG. 1C presents a close up side cutaway view of the embodiment of an axial flux propulsion system presented in FIG. 1A positioned within the boat presented in FIG. 1D.
Figure 1D:
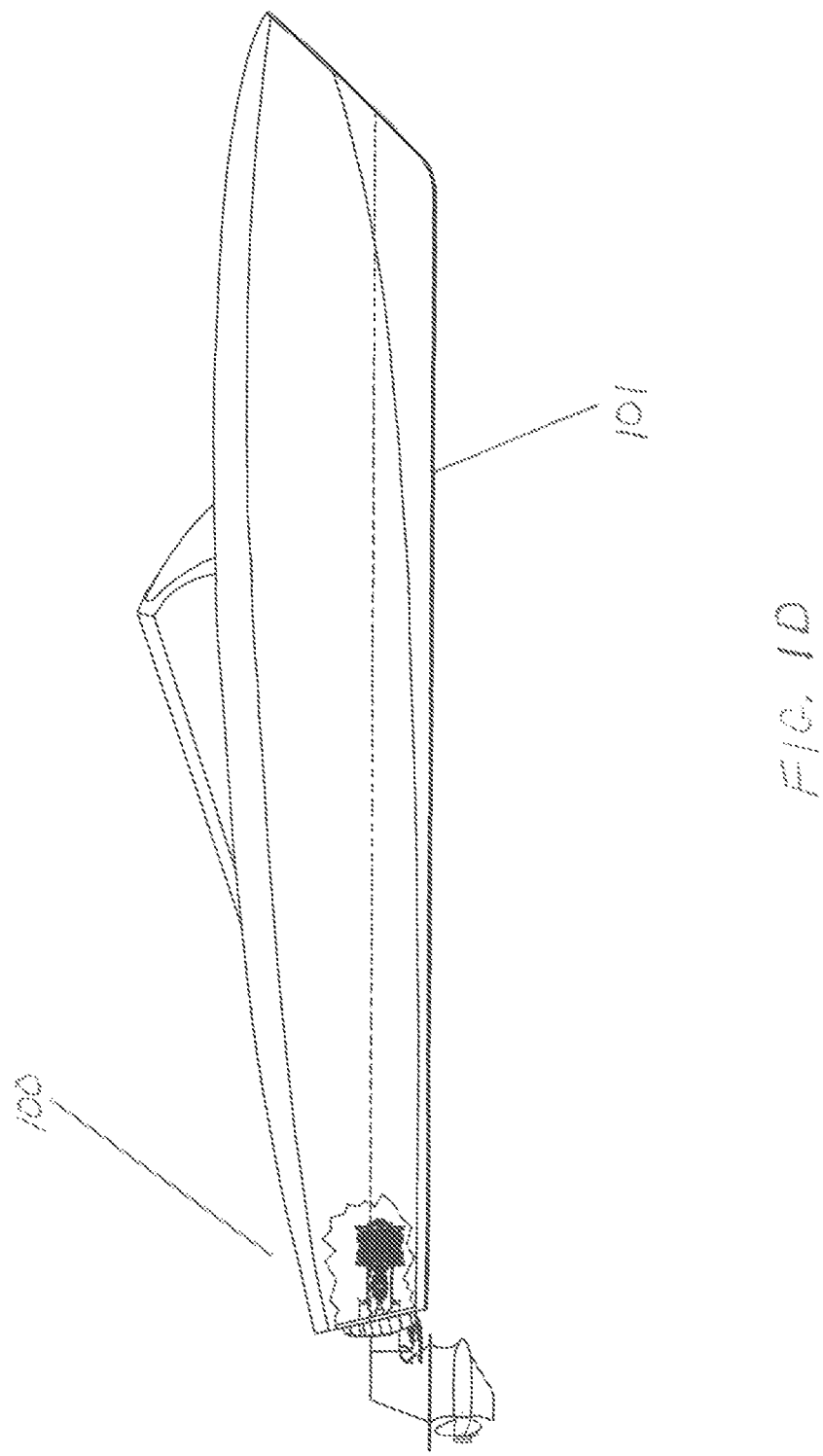
FIG. 1D presents a side cutaway view of the embodiment of an axial flux propulsion system presented in FIG. 1A positioned within a boat.
Figure 4A:
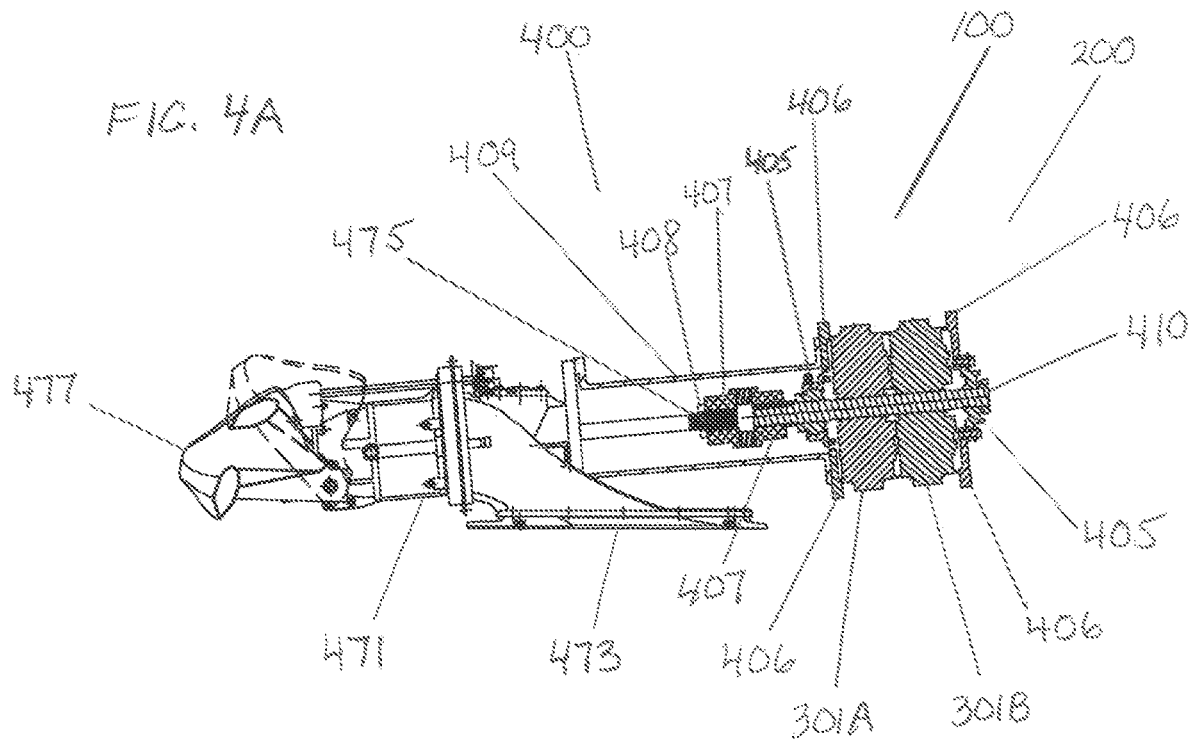
FIG. 4A presents a side cutaway view of an embodiment of an axial flux propulsion system having multiple axial flux motors/generators and a jet drive output.
Figure 4B:
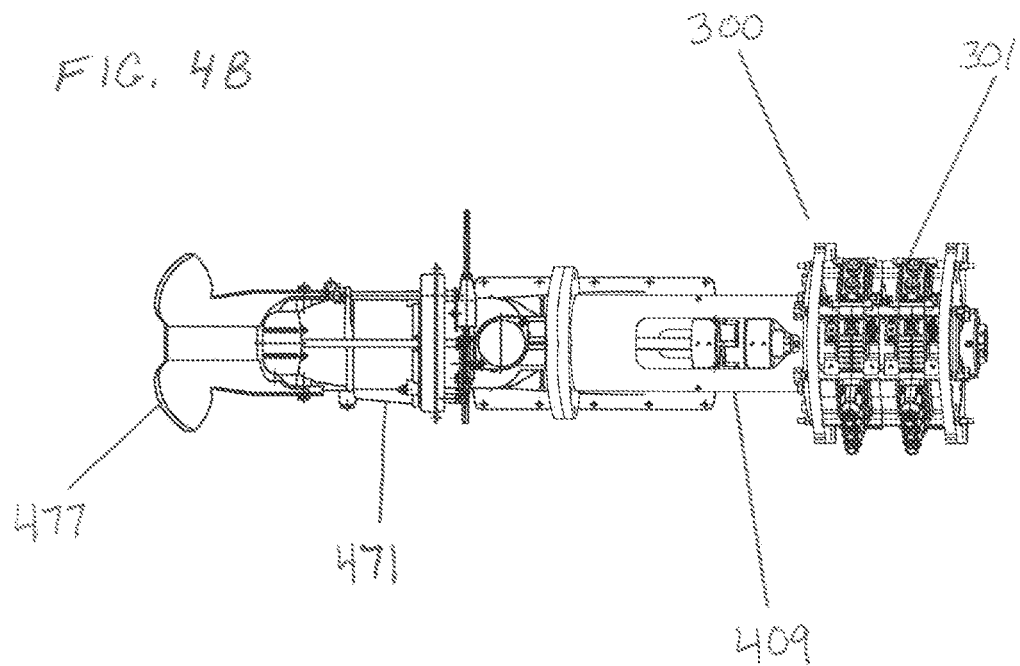
FIG. 4B presents a top plan view of the embodiment of an axial flux propulsion system presented in FIG. 4A.
Figure 4C:
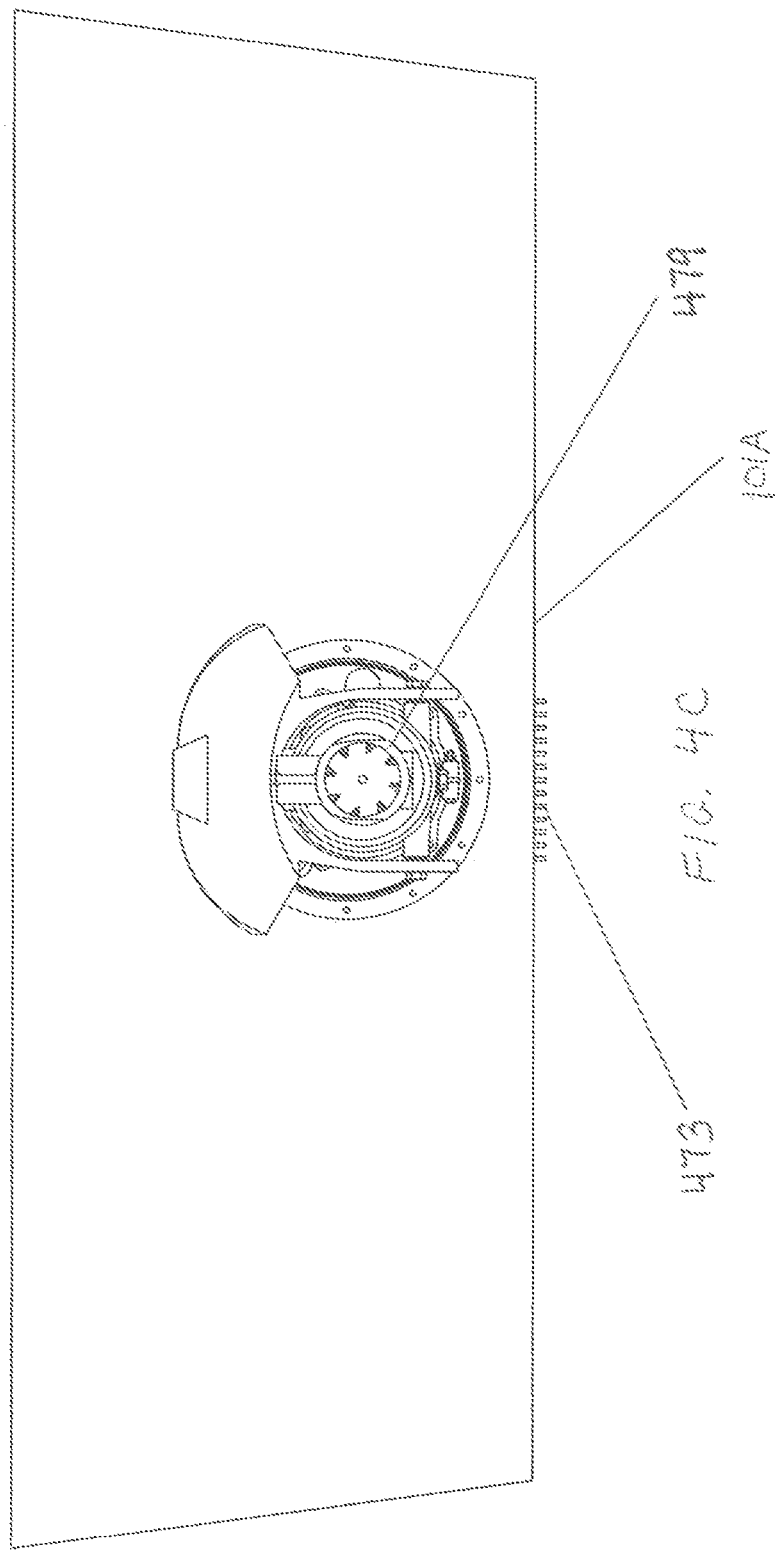
FIG. 4C presents a rear view of the embodiment of an axial flux propulsion system presented in FIG. 4A positioned within the boat presented in FIG. 4E.
Figure 4E:
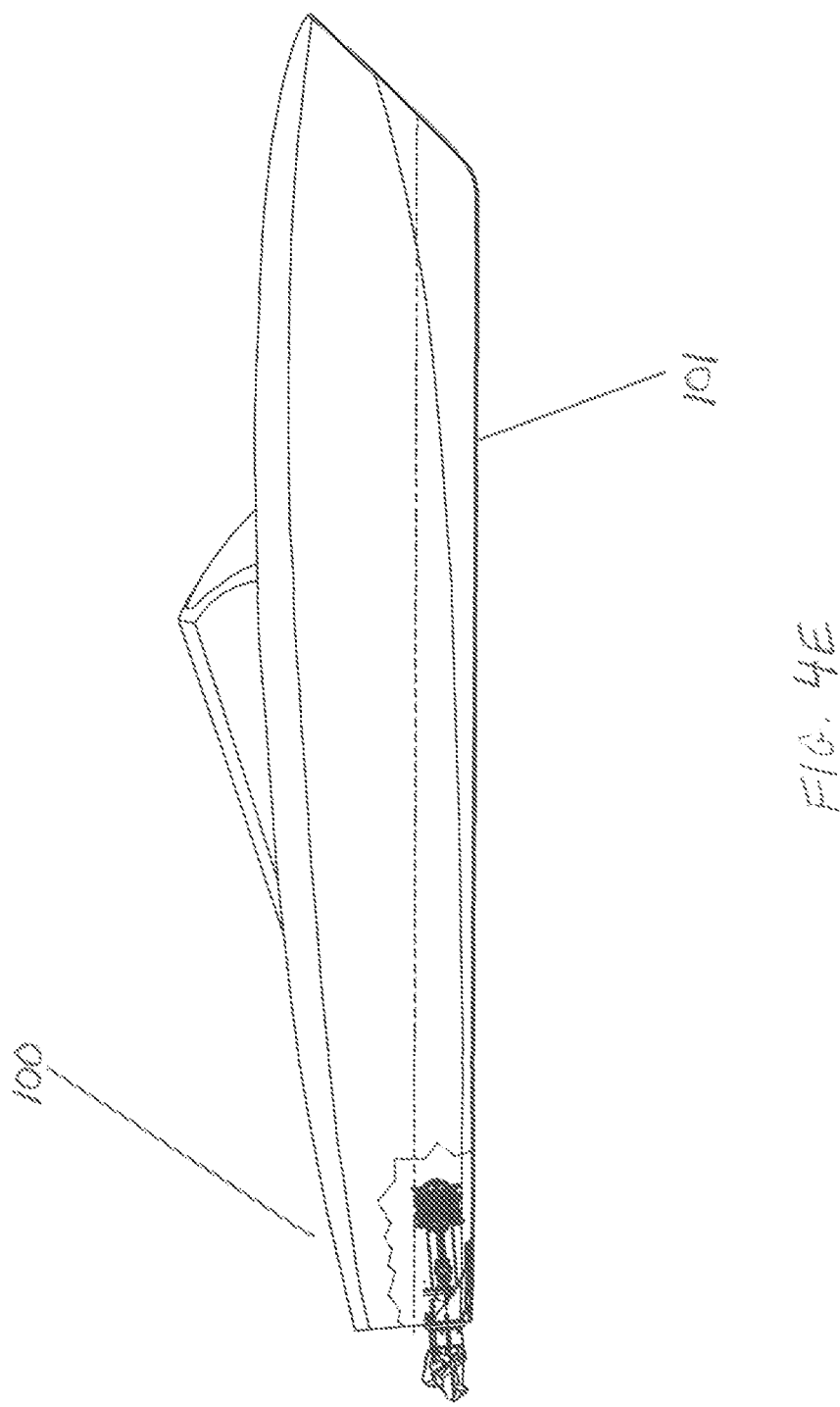
FIG. 4E presents a side cutaway view of the embodiment of an axial flux propulsion system presented in FIG. 4A positioned within a boat.
Figure 5A:
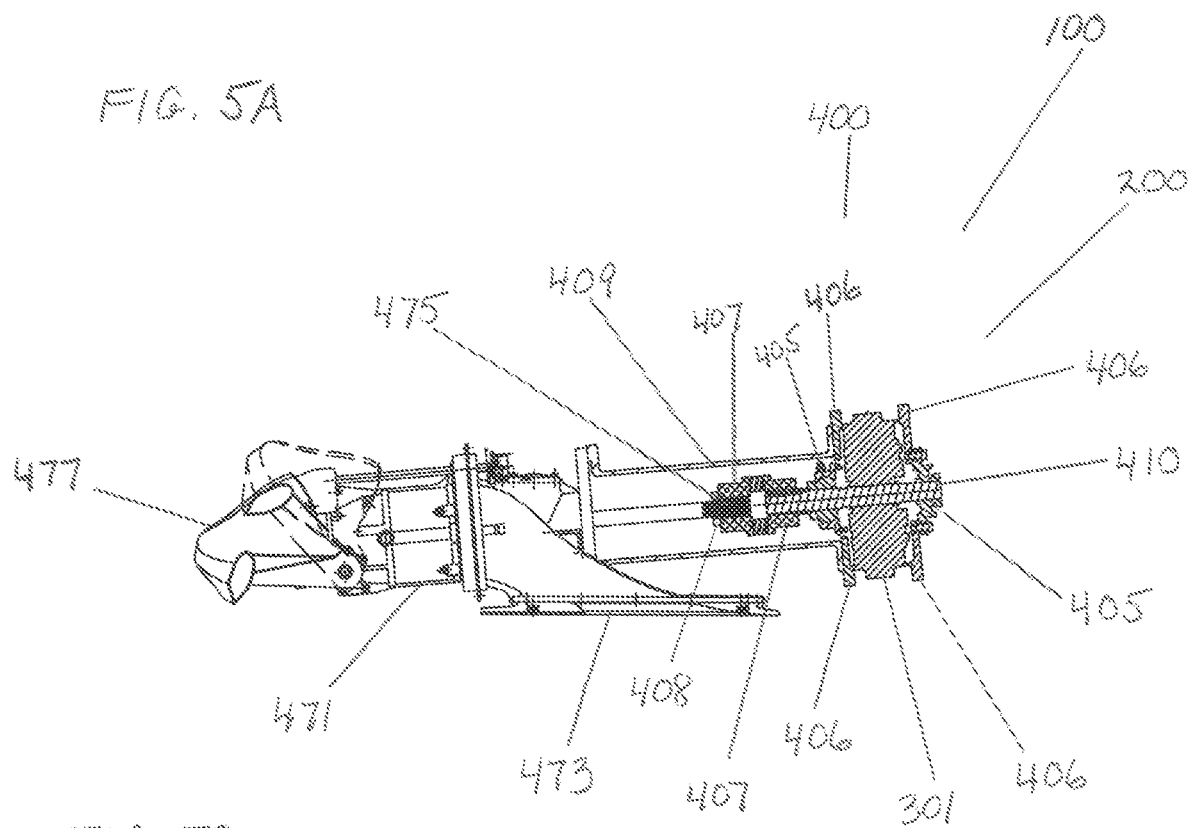
FIG. 5A presents a side cutaway view of an embodiment of an axial flux propulsion system having one axial flux motor/generator and a jet drive output.
Figure 5B:
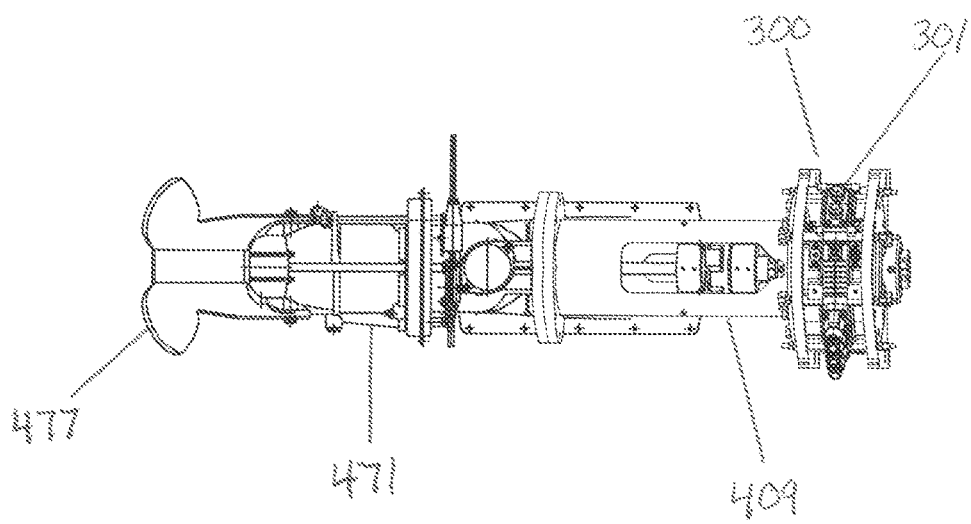
FIG. 5B presents a top plan view of the embodiment of an axial flux propulsion system presented in FIG. 5A.

As shown in FIG. 4A, a second alternate embodiment of an axial flux propulsion system (100) for an electric boat (101) may include a traction system (300) including a first axial flux motor/generator (301A) positioned adjacent to a second axial flux motor/generator (301B), wherein both motors/generators (301) are again positioned on a common transmission shaft (410). Like the prior embodiment, the first and second axial flux motors/generators (301A, 301B) may be operated in unison or independently of each other, as directed by the control system (600). The first and second axial flux motors/generators (301A, 301B) may be operated to propel the relevant boat (101) in water, to charge any onboard or other batteries (520), or for another purpose.

The axial flux motors/generators (301A, 301B) may be connected at their central core region to a common transmission shaft (410), as shown in at least FIG. 4A through 5B. The transmission shaft (410) may then be supported by one or more (typically a pair of) support bearings (405) that are positioned on motor mounts (406) or similar supportive structures. The motor mounts (406) may be attached to the hull of the relevant boat (101) or to some other structure, such as a boat substructure. The transmission shaft (410) typically extends into a shaft coupling (407). The transmission shaft (410) is typically coupled to a transmission box stub (475) by the shaft coupling (407) and a collar (408). The transmission box stub (475) may be mechanically linked or coupled in or around a shaft housing (409) to a pumping unit (471). This connection may be direct or may include intervening couplings.

Axial flux propulsion system (100) for jet drives typically extend through the relevant boat transom (103) at a point near the transmission stub (475) or components of the pumping unit (471). The transmission shaft (410) and transmission box stub (475) are typically enclosed in the shaft housing (409) that is attached to a motor mount (406) or other support structure. The pumping unit (471) may be in fluid communication with a water intake (473), which may allow for the pumping unit (471) to impart thrust during use. In operation in this exemplary embodiment, the torque from the axial flux motor (301) may be applied to the transmission shaft (410) that is then coupled to the transmission box stub (475). The transmission box stub (475) may then transmit the torque to the pumping unit (471) that pumps water from the water intake (473) and provides propulsion for the relevant boat (101). A deflector (477) may be used to direct the thrusting water expelled by the pumping unit (471), typically through a water discharge nozzle (479). Such a nozzle (479) may take any form that allows for the production of thrust. Such deflection may allow for controlled use of the thrust generated by the expelled water, as would be understood by persons of ordinary skill in the art.

The descriptions of the following systems are generally applicable to both stern drive and jet drive embodiments of an axial flux propulsion system (100) for an electric boat (101).

The Electrical Power Distribution System

The electrical power distribution system (500) is generally responsible for managing the delivery of power from the batteries (520) to the axial flux motors/generators (301), as well as for storing and distributing electrical power throughout the boat, as shown in FIGS. 3, 6, 7, 8A, and 8B.

An embodiment of an electrical power distribution system (500) for storing and distributing electrical power may include at least one battery (520). Typically, the electrical power distribution system (500) will also include a power distribution unit (510) to assist with distributing power around the boat (101) and a charger (540) that may be used to charge the battery (520). An inverter (530) may also be included to power or charge various components of the axial flux propulsion system (100) for an electric boat (101), which may assist by helping convert DC current to AC current.

The electrical power distribution system (500) further may include generally known electric vehicle power distribution equipment including inverters; converters; chargers; connection or other buses; battery disconnect units; safety circuit breakers; fuses; temperature sensors; battery condition sensors; voltage, current, or frequency sensors; power, current, or voltage conditioning circuitry; and power system condition indicating elements (such as lights or electronic messaging). Typically, the at least one battery (520) is a bank of batteries or battery packs.

In an exemplary embodiment, the power distribution unit (510) of the electrical power system (500) may provide the axial flux motors/generators (301) current and voltage drawn from at least one battery (520). Further, this control may allow for the various operations of the axial flux propulsion system (100) for an electric boat (101), including the overall control of the operation of the axial flux motors/generators (301). At least one inverter (530) and at least one charger (540) may assist in conditioning and distributing power throughout the electrical power system (500). For example, the at least one inverter (530) and at least one charger (540) may be used to charge the batteries (520) using either the axial flux motors/generators (301) or an auxiliary power source, such as an onboard internal combustion motor or an external power source.

The Control System and Graphical User Interface

An embodiment of a control system (600) may include at least a communication system (601) and a throttle (602) that together direct the operation of boat subsystems. The control system (600) may direct the electrical power distribution system (500) to increase, decrease, or suspend electrical power (including at least current, voltage, frequency, or phase) to the transmission system (400) in response to signals from the throttle (602) or communication system (601).

Figure 12:
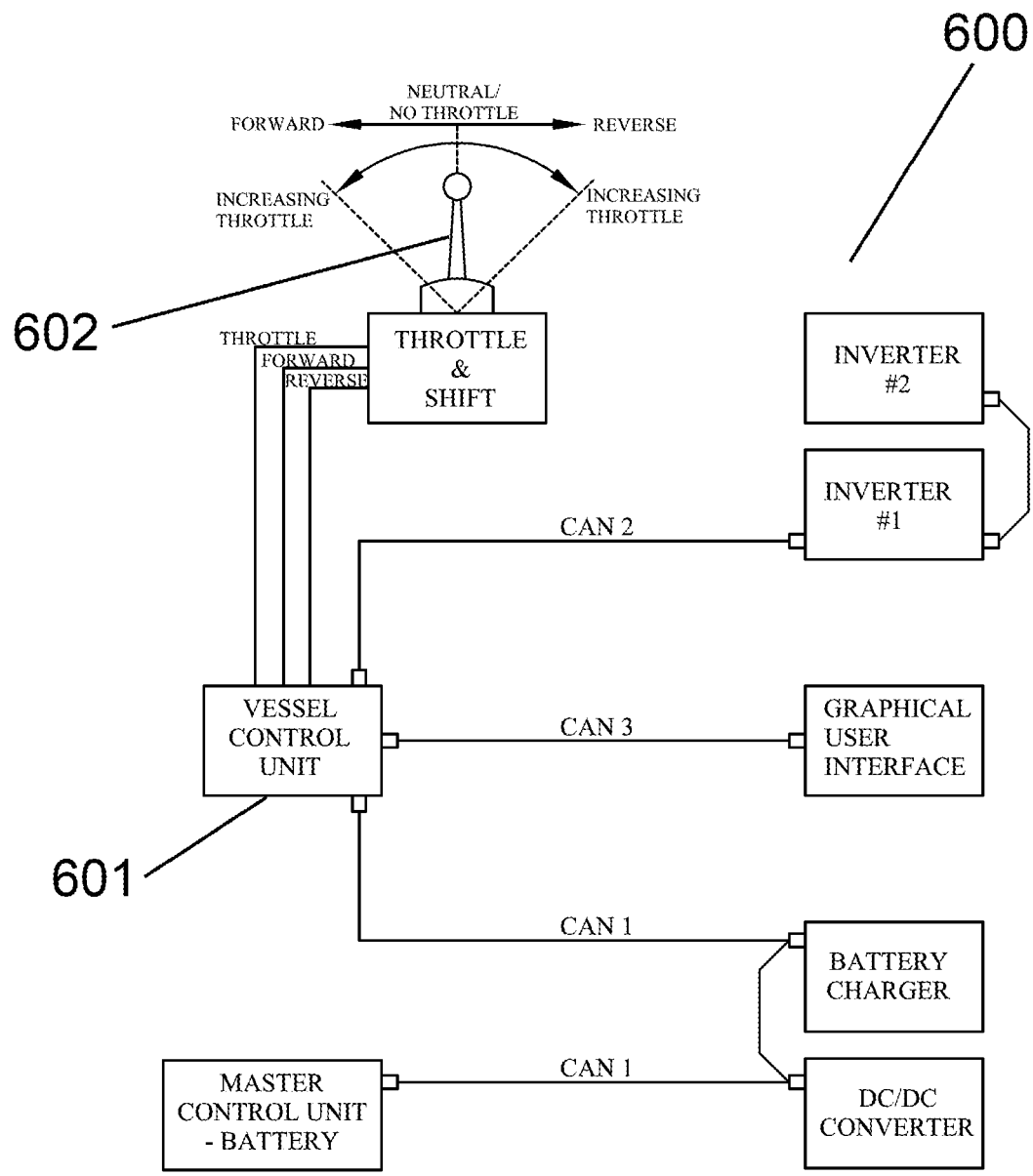
FIG. 12 presents a diagram of an embodiment of control system components for an axial flux propulsion system.

The control system (600), as shown in FIG. 12, includes at least a communication system (601) and a throttle (602) that together direct the operation of boat subsystems, such as directing the electrical power distribution system (500) to increase, decrease, or suspend electrical power to the transmission system (400). Such changes in the electrical power distributed to the transmission system (400) may be in response to signals received from the throttle (602) and communication system (601). The control system (600) may also monitor the various boat subsystems for faults and direct the appropriate response to any fault.

The control system (600) may be analog, digital, or a combination of both, as would be understood by persons of ordinary skill in the art. The control system (600) may include a computer, mobile device, or any combination of these and other hardware and software.

The control system (600), which may also be referred to as a Vessel Control Unit (VCU), may use, as applicable, controller area network (CAN) bus protocols (including al least CAN 2.0 and CAN FD), the National Marine Electronics Association (NMEA) 2000 standard, and the NMEA 0183 standard. Additionally, as needed, vehicle control communications can be performed using Bluetooth, Wi-Fi, 5G thru 1G, near field communications (NFC), satellites, optics, or any other wireless or wired technologies known to persons of ordinary skill in the art.

Figure 8A:
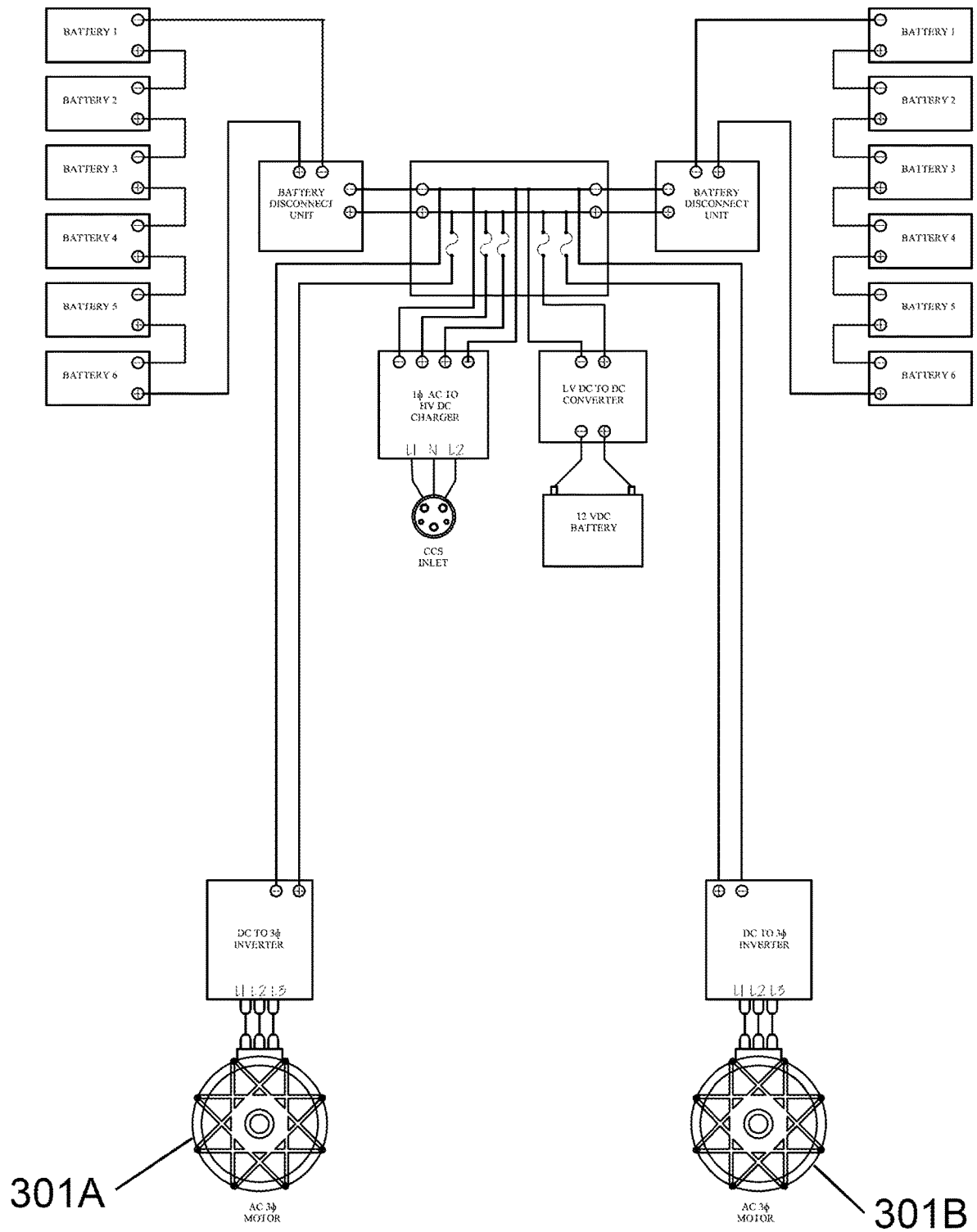
FIG. 8A presents an embodiment of a power delivery system for an embodiment of an axial flux propulsion system having multiple axial flux motors/generators.
Figure 8B:
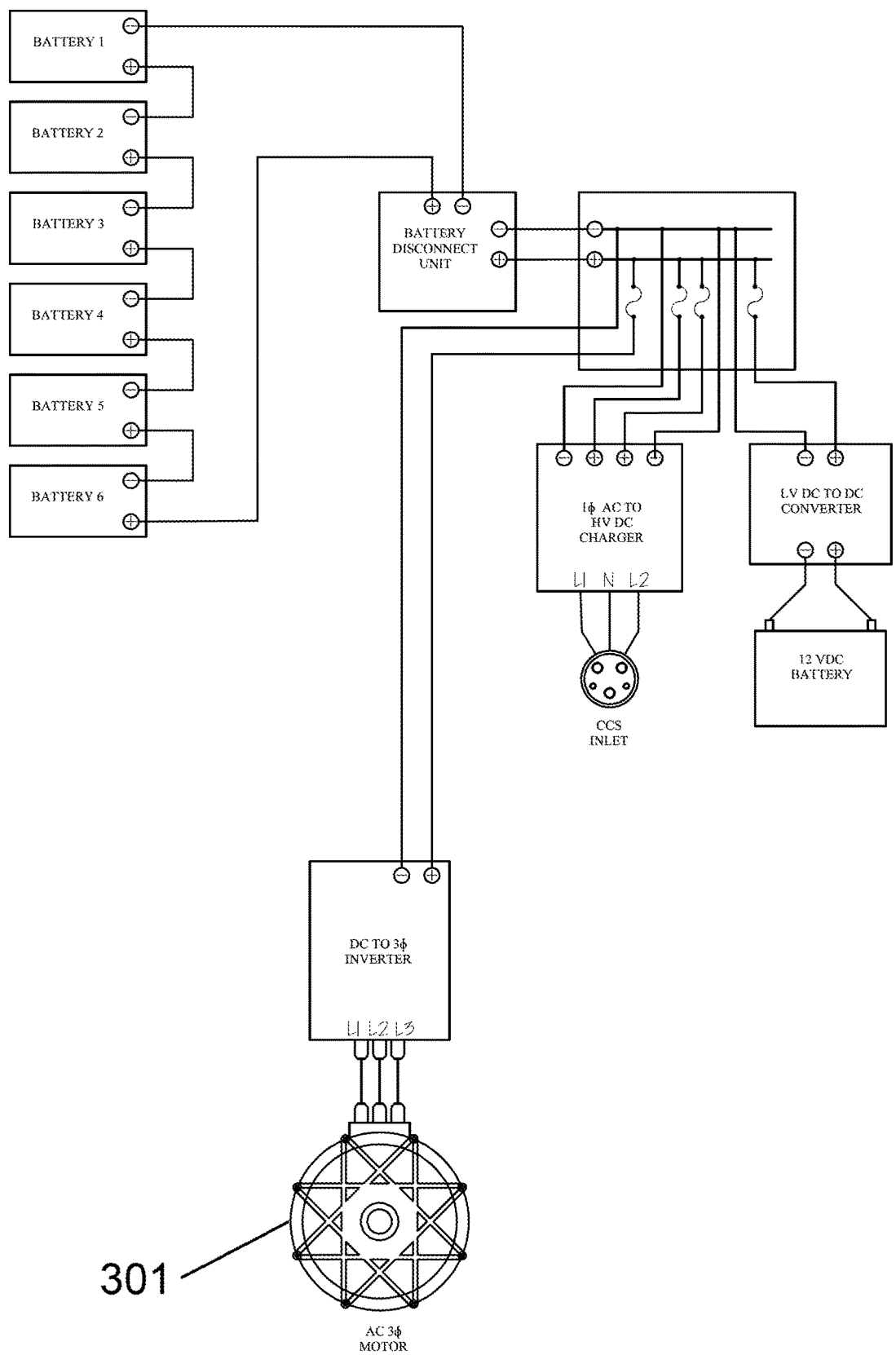
FIG. 8B presents an embodiment of a power delivery system for an embodiment of an axial flux propulsion system having one axial flux motor/generator.

As shown in FIGS. 8A and 8B, embodiments of the axial flux motors (301) may be AC, three-phase motors/generators that receive power from a bank of batteries (520) via a CAN bus.

Figure 10:
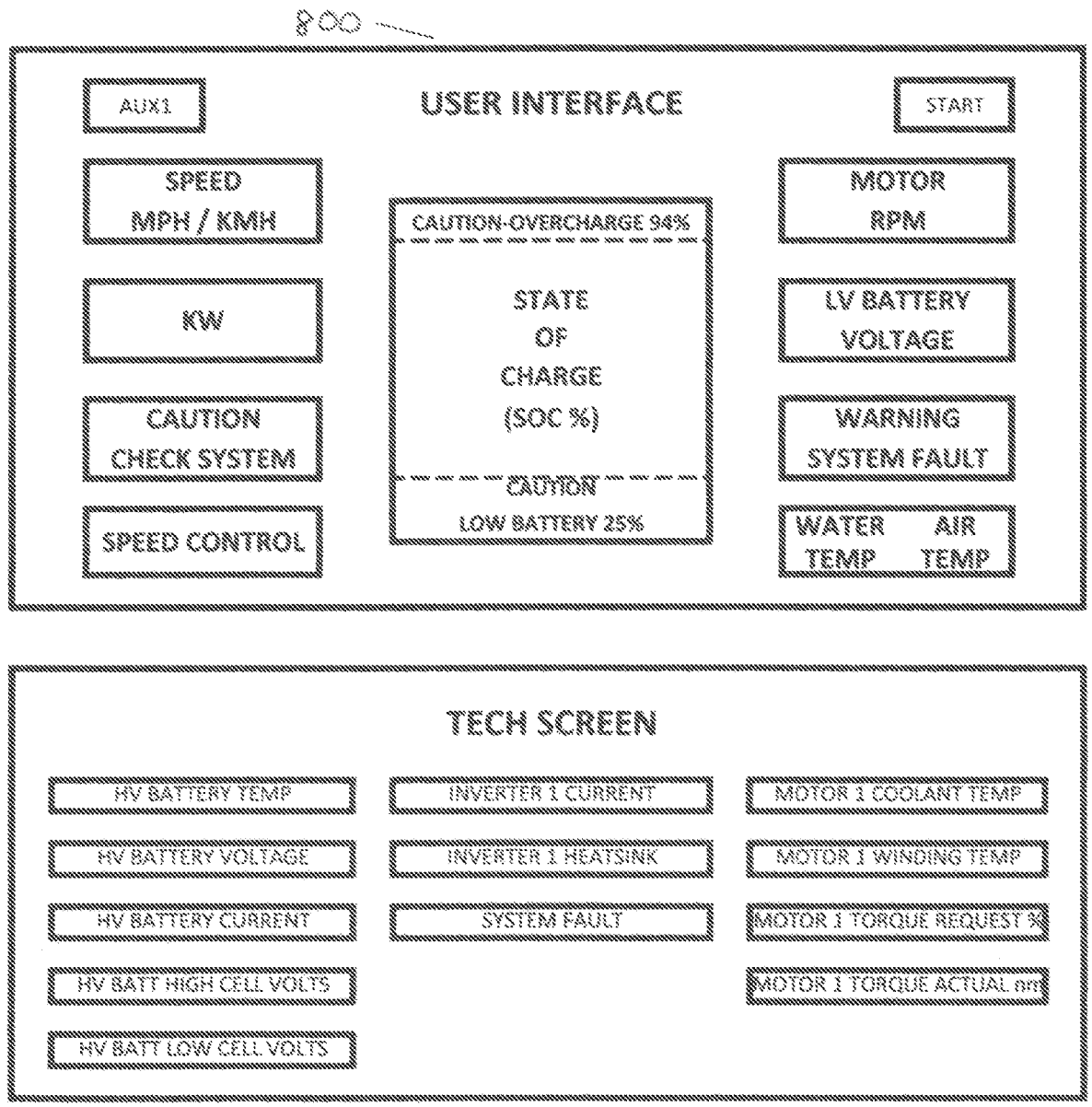
FIG. 10 presents an embodiment of a graphical user interface for use with an axial flux propulsion system.

The axial flux propulsion system (100) may further include a graphical user interface (800). As shown in FIG. 10, an embodiment of such a graphical user interface (800) may provide a visual display of various (and often important) information about the state of the vehicle subsystems, as well as about more generalized information, such as date and time. The graphical user interface (800) (also referred to herein as a display or a GUI) also may provide a given boater (or other vehicle occupant) access to speed controls, which controls may be used to set the speed of the boat (101) to a set speed. The boat (101) may be brought on plane and proceed at a speed that approximates the desired and set speed. In some embodiments, a "Speed Control" button may be pressed on the display (800) or elsewhere and subsequently adjusted "UP" or "DOWN" to set the desired speed. To turn the speed control off, the boater may press the "OFF" button on the display, decelerate the boat using the relative controls, or otherwise reduce the speed of the boat using other methods, as would be understood by a person of ordinary skill in the art. In other embodiments, the boater may use controls that are distinct from those included with the graphical user interface (800).

The graphical user interface (800), as shown in FIG. 10, may be toggled to display system information on a "TECH SCREEN", which screen may be used during maintenance and troubleshooting of the system (100), or for any other purpose.

The Fluid Management System

An embodiment of a fluid management system (700) for cooling components of the propulsion system may include at least one fluid flow path (701) and various components that may be used to cool portions of the axial flux propulsion system (100).

Figure 9:
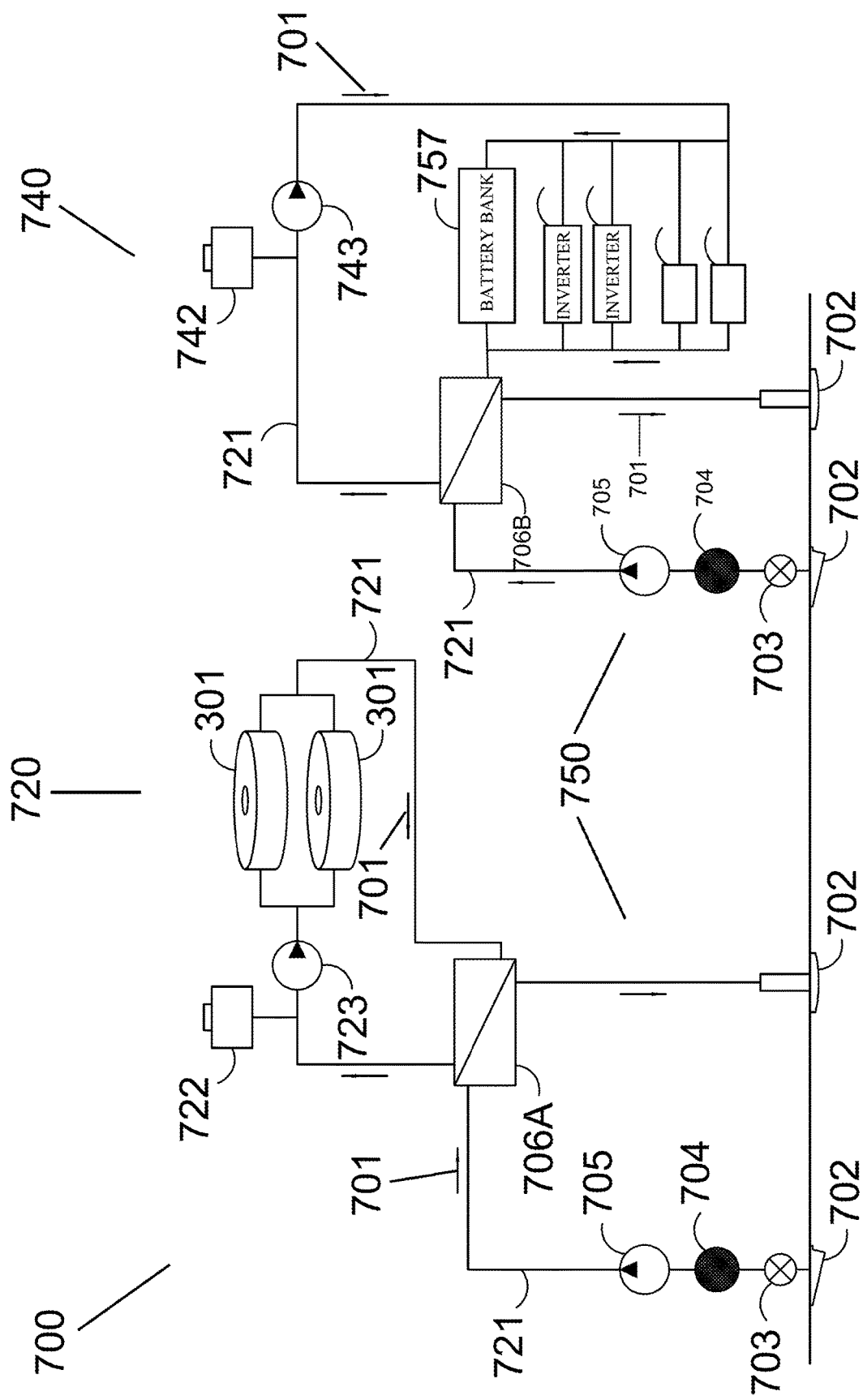
FIG. 9 presents an embodiment of a cooling system for an axial flux propulsion system.

The fluid management system (700), as shown in FIG. 9, may include a raw water subsystem (750), a motor cooling subsystem (720), and a battery cooling subsystem (740). The fluid management system (700) may provide independent, autonomous cooling of the separate cooling subsystems. The fluid management system (700) may include at least one fluid flow path (701) for circulating cooling fluid. Such a system (700) may use a variety of fluids, including raw water intake fluid (such as raw water) from boat ports (702) provided on the hull of the relevant boat (101). Temperature sensors (not shown in the figured) may be distributed throughout the fluid management system (700) to provide temperature information of the applicable fluids or the temperature of system elements.

Further, the fluid management system (700) subsystems may use a predetermined water, ethylene, and glycol (WEG) solution, and/or a predetermined dielectric oil solution. A person of ordinary skill in the art would understand that the choices of features such as fluid chosen, fluid path elements, and equipment for monitoring or controlling the fluid flow may be selected while considering the cooling or heating requirements presented by the manufactures of the various fluid management system component.

Once the relevant boat (101) has been lowered into a body of water (such as a lake), boat ports (702) below the waterline may direct or push raw water into the raw water subsystem (750) of the fluid management system (700).

Within the raw water subsystem (750), a seacock valve (703) may control the flow of raw water travelling further into the fluid management system (700). With the seacock valve (703) closed, no raw water may travel further into the fluid management system (700) from the boat port (702). On the other hand, when the seacock valve (703) is open, raw water can travel further into the fluid management system (700) from the boat port (702). A sea strainer (704) may be provided in the fluid flow path (701) after the seacock valve (703) to minimize foreign objects entering the raw water subsystem (750) along with the raw water.

After the raw water is strained of debris, an intake circuit pump (705) will typically pump/direct the raw water (or other fluid) to a heat exchanger (706). At the heat exchanger (706), the raw water may impinge on surfaces within the heat exchanger (706) and draw heat away from the internal heat exchanger surfaces. When working properly, the raw water enters the heat exchanger (706) at a lower temperature than it is when the water exits. This warmed raw water may then be expelled from the heat exchanger (706) along a fluid flow path (701) that exits the boat hull through a boat port (702).

The motor cooling subsystem (720), which may be electronically monitored and controlled by the control system (600), may include a motor cooling subsystem reservoir (722), a motor cooling subsystem circulating pump (723), and a motor cooling subsystem heat exchanger (706A).

Within the motor cooling subsystem (720), the working fluid (721) may be selected based on the specifications provided by the motor manufacturer to optimize motor operation. A person of ordinary skill in the art would understand that changes in the number of motors used, in the size of the motors, in the features of the motors, or other motor-related changes may require appropriate changes to the motor cooling subsystem (720). For example, the use of more motors may necessitate the use of additional cooling elements and additional cooling fluid circulating within the motor cooling subsystem (720).

In typical operation, the motor cooling subsystem circulating pump (723) continually circulates the working fluid (721) within the motor cooling subsystem (720). The reservoir (722) typically provides a high enough fluid level buffer to maintain a constant flow of circulating working fluid (721). As the working fluid (721) flows through the interior of each axial flux motor (301), the working fluid (721) draws heat from the motor components. The heated working fluid (721) may then exit the axial flux motor (301) and be directed through the heat exchanger (706A). At the heat exchanger (706A), the heated working fluid (721)

typically transfers at least some of its heat to the cooler raw water circulating within the raw water subsystem (750).

The battery cooling subsystem (740), which may be electronically monitored and controlled by the control system (600), may include a battery cooling subsystem reservoir (742), a battery cooling subsystem circulating pump (743), and a battery cooling subsystem heat exchanger (706B). The battery cooling system (740) typically cools battery system components (757), which components may include an on-board charger, a dc/dc converter, inverters, and banks of batteries, as discussed above.

Within the battery cooling subsystem (740), the working fluid (721) may be selected based on the specifications provided by the battery systems manufacturer to optimize battery operation. A person of ordinary skill would understand that changes in the number of batteries, the sizing of the batteries, the features of the batteries, or other battery-related changes may require appropriate changes to the battery cooling subsystem (740).

In typical operation, the circulating pump (743) continually circulates the working fluid (721) within the battery cooling subsystem (740). The reservoir (742) typically provides a high enough fluid level buffer to maintain a constant flow of circulating working fluid (721). As the working fluid (721) flows through the interior of each battery system component (757), the fluid draws heat from the respective components. The heated working fluid (721) may then exit the battery system components (757) and be directed through the heat exchanger (706B). At the heat exchanger (706B), the heated working fluid (721) typically transfers at least some of its heat to the cooler raw water circulating within the raw water subsystem (750).

General Theory of Operation

Startup

During a typical startup of an embodiment of axial flux propulsion system (100), the throttle may be positioned straight up in neutral (referred to herein as the neutral position or position T0), and the subsystems are turned on. This process may proceed by any number of actions including a button press, entry of a key, the turn of a key, or the like. The axial flux propulsion system (100) may provide time for subsystems to stabilize, as applicable. Typically, this would include initiating the batteries (520), which may include the toggling of a battery disconnect unit. Further, cooling loop pumps may be given time to circulate fluid to the batteries (520), the inverters (530), and motors/generators (301), among other components.

Within the startup period, the control system (600) typically confirms that the subsystems are ready for operation. During this period, fault indications may be processed, and the current status of various subsystems may be provided on the graphical user interface (800), which graphical user interface (800) typically may be removably positioned anywhere suitable on the boat (100). For example, such a graphical user interface (800) may be positioned on a dashboard of the relevant boat (101), or around the helm area of the boat (101). Boaters may use the subsystem status information of the graphical user interface (800) for planning their boating activities. For example, by reviewing the remaining State-Of-Charge (SOC), or how much charge remains on the boat's electric power systems, a boater may estimate the battery drain of various boating activities and chose accordingly.

Thus, in this embodiment, upon initial startup, the applicable subsystems are turned on, but the traction system (300) is disengaged and the axial flux motor/generator (301) is powered down.

Idle

After the subsystems are appropriately initiated, the boater may shift the throttle (602) to indicate a forward idle position (position T1) in order to slowly guide the boat (101) forward. Movement of the throttle may be sensed, which sensing typically results in the sending of a signal to the control system (600) to power the axial flux motor/generator (301) on, off, or to alter the speed. Alternate methods for turning the axial flux motors (301) on or off may include a mechanical switch or any other on/off type devices known by persons of ordinary skill in the art. The boater may also shift the throttle (602) to a reverse idle position to slowly idle backward (position T4). Forward speed and reverse speed may be increased by moving the throttle (602) further forward (position T3) or further back (position T5), respectively.

Managing reverse and forward thrust in the water may be handled in a number of different ways. For a jet drive embodiment, the deflector (477) may be used to direct the thrusting water in a reverse direction. In a stern drive embodiment, the propeller (450) is typically used to provide both forward and reverse thrust. However, the control of that propeller (450) may vary between embodiments.

In some stern drive embodiments, the axial flux motors/generators (301) may be operated so as to rotate in only a single direction about its rotational axis. In such an embodiment, a transmission may be used to provide both forward and reverse gears. Specifically, because the axial flux motors/generators (301) rotate only in a single direction, the transmission shaft (410) and a transmission box stub (475) each rotate only in a single direction, which direction is typically the same direction of rotation as the motors/generators (301). Then the transmission box stub (475) may be temporarily connected to different gears within the transmission box (470) with the output of the transmission box (470) being the propeller shaft (449). By using one or more gears that cause the rotation of the propeller shaft (449) to rotate in the same direction as the axial flux motors/generators (301) and one or more gears that cause the opposite direction of rotation, forward or reverse thrust may be provided.

In other stern drive embodiments, the motors/generators (301) may themselves be operated in opposite rotational directions. In such a case, forward and reverse gearing may still be included. However, in some embodiments, only one direction of gearing may be required, and the motors/generators (301) themselves may be reversed to provide reverse thrust. This reversal of the rotational direction of the motors/generators (301) may be accomplished by reversing the polarity of the motors/generators (301).

In some embodiments, including any configuration that requires the axial flux motor/generator (301) to run at idle speed in order to engage a hydraulic clutch, a "START/STOP" button, or other switch or indicator, may be utilized to start and stop the axial flux motor/generator (301).

Running Speed

The boater may adjust the boat running speed (position T2) as desired by pushing the throttle (602) forward to increase boat speed or by pulling the throttle (602) back to decrease boat speed. Throttle (602) positions (not shown) may be provided to incrementally adjust the boat speed.

Preset Speeds

Boaters can maintain boat speed (position T3) and enter a preset speed limit or manually adjusted boat speed (position T3) range (including using a control system algorithm or GPS speed control, such as to maintain the boat under 5 mph or near 10.8 mph for wake surfing).

Back to Idle

From a preset speed (position T3), boaters can move the throttle (602) to decelerate the boat (101) back into idle or accelerate back up to running speed (position T2). When the boat (101) is shifted back into neutral (position T1 to position T0), the axial flux motor/generator (301) is disengaged.

System Shut Off

After shifting to neutral, the boater may turn the boat (101) completely off. The axial flux propulsion system (100) may include a shutdown delay to allow the subsystems to shut down in an organized manner. For example, some of the cooling components may run a fan for a period of time after being turned off to ensure proper cooling on shutdown.

Each of the positions (such as T0 and T1) discussed above may be physical positions or merely representative of the related operating conditions. When the positions are physical, they may be indicated by any visible or haptic indicator, such as hash marks or detent positions.

General Subsystems and Operations

The propulsive force of the axial flux propulsion systems (100) disclosed herein may be provided by at least one axial flux motor/generator (301) that is connected to a transmission system (400) via a transmission shaft (410), which transmission shaft (410) may extend through the core region of the axial flux motor/generator (301) to a propeller (450) or pumping unit (471).

FIGS. 11A, 11B, and 11C present tables that indicate the status of the axial flux propulsion system (100) during various stages of operation. Importantly, the axial flux motors/generators (301) may be present during the various states of operations but may be disengaged or engaged; charging or discharging; or applying traction or not, among other conditions. Each axial flux motor/generator (301) may be used as either a motor (resulting in applying torque) or as a generator (resulting in the production of electricity). In the latter case, there would be another source of input torque. In any situation, the axial flux motors/generators (301) may be selectively operated as generators for at least a portion of their usage time.

Further, the axial flux propulsion system (100) may be supplemented by any engine known to persons of ordinary skill in the art, including internal combustion, Wankel, Stirling, steam, nucleonic, microwave, human powered, pneumatic, hydraulic, wind, biofuel, microbial, and aquatic engines. Such supplementation may be used to create driving electricity or to provide additional torque at the propeller or other output.

As shown in the FIGS. 11A, 11B, and 11C, selection of the torque and power engagement of the transmission system (400) may be performed via the throttle (602). Exemplary operation modes are provided in FIGS. 11A, 11B, and 11C. The operational modes may be selectable by the throttle (602) and may be programmed into the control system (60M).

As discussed briefly above, the axial flux motors/generators (301) may be selectively engaged to provide additional or changing torque. Further, the use of independent motors may allow for the selective use of either motor functions (such as providing torque) or generator functions (such as for charging batteries or powering subsystems).

An embodiment of a process for charging the batteries (520) will now be discussed. First, the batteries (520) must be connected into the power distribution system (500), as would be the case when the axial flux propulsion system (100) is being turned on. Then, a charging cord may connected to an AC power source by plugging the one end of the charging cord into an output for the power source and plugging the second end into a charging input of the axial flux propulsion system (100). The charging input may be connected to an onboard charger (540). The batteries (520) may then be charged using the power source. When the charger cord is plugged into the charging input, the circulating pump (743) for the battery cooling loop (740) may automatically come on. All other pumps (705, 723) typically remain off while charging the batteries (520). A battery management system may automatically turns off the charger when the battery reaches full state of charge. The circulating pump may automatically shut off when charging is stopped for any reason. Finally, once charging is complete, the batteries may be switched off or otherwise disengaged.

Within the marine industry, and in particular within the wakeboarding field, optimizing the use of the propulsion system to provide either torque or battery charging energy presents a new range of functionality. This may be because boaters may then alternate between boat use periods and boat system charging periods as desired or as applicable.

For example, boaters may wakeboard for an hour or two and then rest for an hour or two while the axial flux propulsions system (100) is charged. Boaters may selectively determine how long to wakeboard with consideration for the recharging period and plan accordingly. Further, with the proliferation of various electric vehicle charging stations and charging equipment, the axial flux propulsions system (100) for an electric boat (101) of the instant invention is presented with ever-widening charging options.

Throughout this disclosure, the term "computer" describes hardware that generally implements functionality provided by digital computing technology, particularly computing functionality associated with microprocessors. The term "computer" is not intended to be limited to any specific type of computing device, but it is intended to be inclusive of all computational devices including, but not limited to, processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including, without limitation: a network server farm, "cloud" computing system, software-as-a-service, or other distributed or collaborative computer networks.

Those of ordinary skill in the art also appreciate that some devices that are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

As will be appreciated by one skilled in the art, some aspects of the present disclosure may be embodied as a system, method or process, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including, without limitation, virtual processors, or by the use of run-time environments, virtual machines, and/or interpreters. Those of ordinary skill in the art recognize that software can be wired or embedded into hardware, including, without limitation, onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Program code embodied on a computer readable medium may be transmitted using any appropriate medium, including but not limited to wireless, wireline, optical fiber cable, RF, etc., or any suitable combination of the foregoing.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "cloud" and "cloud computing" and similar terms refers to the practice of using a network of remote servers hosted and accessed over the Internet to store, manage, and process data, rather than local servers or personal computers.

Throughout this disclosure, the term "GUI" generally refers to a graphical user interface for a computing device. The design, arrangement, components, and functions of a graphical user interface will necessarily vary from device to device depending on, among other things, screen resolution, processing power, operating system, device function or purpose, and evolving standards and tools for user interface design. One of ordinary skill in the art will understand that graphical user interfaces generally include a number of widgets, or graphical control elements, which are generally graphical components displayed or presented to the user and which are manipulable by the user through an input device to provide user input, and which may also display or present to the user information, data, or output.

For purposes of this disclosure, there will also be discussion of a special type of computer referred to as a "mobile communication device" or simply "mobile device." A mobile communication device may be, but is not limited to, a smart phone, tablet PC, e-reader, satellite navigation system ("SatNav"), fitness device (e.g. a Fitbit™ or Jawbone™) or any other type of mobile computer whether of general or specific purpose functionality. Generally speaking, a mobile communication device is network-enabled and communicating with a server system providing services over a telecommunication or other infrastructure network. A mobile communication device is essentially a mobile computer, but one that is commonly not associated with any particular location, is also commonly carried on a user's person, and usually is in near-constant real-time communication with a network.

The term "device" may also be used alone to indicate a mobile device, or with a qualifier to distinguish deferent one such device from another, such as based on who the user of the device is (e.g., "civilian device" and "police device"). Additionally, the systems and methods described herein could be implemented using on-board vehicular computer systems, such as vehicle telematics system or other integrated computer system, rather than a physically carried mobile device such as a phone or tablet. Additionally, with the increasing adoption of automation technology in vehicles, the systems and methods described herein could be used in conjunction with partially or fully automated or self-driving vehicles (whether a civilian and/or police vehicle), and the interactions described herein could be negotiated or otherwise performed manually or automatically using the respective computer systems of each vehicle.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

We claim:

1. An axial flux propulsion system for a stern drive boat comprising:
   a traction system including at least one axial flux motor/generator;
   a transmission box including a transmission box stub:
   a transmission shaft connected to the at least one axial flux motor/generator and to the transmission box stub, the connection being made within the boat;
   a propeller connected to the transmission box stub;
   an electrical power distribution system for providing power to the at least one axial flux motor/generator including at least one battery; and
   a control system that includes at least a communication system and a throttle that together control at least the at least one axial flux motor/generator,
   wherein the control system directs the electrical power distribution system to increase, decrease, or suspend electrical power to the at least one axial flux motor/generator in response to signals from the throttle and the communication system,
   wherein the traction system is a purely electric motor system,
   wherein the transmission box is positioned to extend at least in part from the boat, and
   wherein the at least one axial flux motor/generator is positioned within the boat.

2. The axial flux propulsion system of claim 1, wherein the at least one axial flux motor/generator includes a first axial flux motor/generator positioned adjacent to a second axial flux motor/generator; wherein the first axial flux motor/generator and the second axial flux motor/generator are positioned on the transmission shaft; and wherein the first axial flux motor/generator and a second axial flux motor/generator may be independently operated by the control system.

3. The axial flux propulsion system of claim 1, wherein the axial flux propulsion system is positioned on a boat transform of the boat to provide propulsion for the boat.

4. The axial flux propulsion system of claim 2, wherein the at least one axial flux motor/generator and the at least one battery are substantially aligned along the longest length of the boat.

5. The axial flux propulsion system of claim 1, further comprising a fluid management system, the fluid management system cooling the at least one axial flux motor/generator and the at least one battery.

6. The axial flux propulsion system of claim 5, wherein the fluid management system for cooling further comprising at least one raw water intake port formed in the hull of the boat.

7. The axial flux propulsion system of claim 1, wherein the at least one axial flux motor/generator is a single axial flux motor/generator.

8. The axial flux propulsion system of claim 1, wherein the transmission box further comprises at least one forward gear and at least one reverse gear.

9. The axial flux propulsion system of claim 1, wherein the transmission box includes a plurality of gears, wherein each gear is a forward gear.

10. The axial flux propulsion system of claim 9, wherein the at least one axial flux motor/generator may be operated in a reverse polarity state.

11. An axial flux propulsion system for a jet drive boat comprising:
    a traction system including at least one axial flux motor/generator;
    a pumping unit in fluid communication with a water intake;
    a transmission shaft connected to the at least one axial flux motor/generator and to the pumping unit;
    a transmission box stub connected to the transmission shaft within the boat;
    an electrical power distribution system for providing power to the at least one axial flux motor/generator including at least one battery; and
    a control system that includes at least a communication system and a throttle that together control at least the one axial flux motor/generator,
    wherein the control system directs the electrical power distribution system to increase, decrease, or suspend electrical power to the at least one axial flux motor/generator in response to signals from the throttle and the communication system,
    wherein the pumping unit is positioned to extend at least in part from the boat, and
    wherein the at least one axial flux motor/generator is positioned within the boat.

12. The axial flux propulsion system of claim 11, wherein the at least one axial flux motor/generator includes a first axial flux motor/generator positioned adjacent to a second axial flux motor/generator; wherein the first axial flux motor/generator and the second axial flux motor/generator are positioned on the transmission shaft; and wherein the first axial flux motor/generator and a second axial flux motor/generator may be independently operated by the control system.

13. The axial flux propulsion system of claim 11, wherein the axial flux propulsion system is positioned on a boat transom of the boat to provide propulsion for the boat.

14. The axial flux propulsion system of claim 13, wherein the at least one axial flux motor/generator and the at least one battery are substantially aligned along the longest length of the boat.

15. The axial flux propulsion system of claim 11, further comprising a fluid management system, the fluid management system cooling the at least on axial flux motor/generator and the at least one battery.

16. The axial flux propulsion system of claim 15, wherein the fluid management system for cooling further comprising at least one raw water intake port formed in the hull of the boat.

17. The axial flux propulsion system of claim 11, wherein the at least one axial flux motor/generator is a single axial flux motor/generator.

* * * * *